(12) United States Patent
Bar-Or et al.

(10) Patent No.: US 7,860,863 B2
(45) Date of Patent: Dec. 28, 2010

(54) OPTIMIZATION MODEL FOR PROCESSING HIERARCHICAL DATA IN STREAM SYSTEMS

(75) Inventors: Amir Bar-Or, Newton, MA (US); Michael James Beckerle, Needham, MA (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 11/850,588

(22) Filed: Sep. 5, 2007

(65) Prior Publication Data

US 2009/0063515 A1    Mar. 5, 2009

(51) Int. Cl.
*G06F 7/00* (2006.01)
(52) U.S. Cl. .................... 707/736; 707/999.1; 717/144; 717/132
(58) Field of Classification Search ................. 707/100, 707/101, 999.1, 736; 717/144, 132
See application file for complete search history.

(56) References Cited

U.S. PATENT DOCUMENTS

| | | | |
|---|---|---|---|
| 4,145,733 A * | 3/1979 | Misunas et al. ............. | 718/106 |
| 5,021,947 A | 6/1991 | Campbell et al. | |
| 5,465,372 A | 11/1995 | Gottlieb et al. | |
| 5,555,201 A | 9/1996 | Dangelo et al. | |
| 5,603,018 A * | 2/1997 | Terada et al. ................ | 712/220 |
| 5,724,570 A | 3/1998 | Zeller et al. | |
| 5,801,958 A | 9/1998 | Dangelo et al. | |
| 5,806,062 A | 9/1998 | Chen et al. | |
| 5,822,593 A | 10/1998 | Lamping et al. | |
| 6,192,504 B1 | 2/2001 | Pflüger et al. | |

(Continued)

OTHER PUBLICATIONS

Dennis, J.B. and David P.M., "A Preliminary Architecture for a Basic Data-Flow Processor", vol. 3, No. 4, Dec. 1974, pp. 126-132.

(Continued)

*Primary Examiner*—Tim T. Vo
*Assistant Examiner*—Shiow-Jy Fan
(74) *Attorney, Agent, or Firm*—Janaki K. Davda; Konrad Raynes & Victor LLP

(57) ABSTRACT

Provided are techniques for optimizing the processing of hierarchical data. A linear processing graph is received, wherein the linear processing graph includes a plurality of operators, wherein each operator in the plurality is connected to at least one other operator by an arc, wherein hierarchical data flows on arcs, wherein the operators read and replace identified subregions within the hierarchical data flowing into the operators on the arcs, and wherein the operators do not modify the hierarchical data outside of these identified subregions. For each operator in the linear processing graph, a minimal set of dependent upstream operators on which that operator depends is found by examining how the identified subregions are created in the linear processing graph through obtaining a set of operators on which that operator depends, by analyzing dependencies carried by a set of vector nodes of the hierarchical data in an input schema of the operator, and, for each of the vector nodes, by analyzing an associated set of scalar nodes, wherein finding the minimum set of operators includes taking into consideration data preservation characteristics of the plurality of operators and taking into consideration structural-order preservation characteristics of the plurality of operators. The linear processing graph is rewritten to create a new graph that expresses dependencies based on the minimal set of dependent upstream operators for each operator.

15 Claims, 24 Drawing Sheets

U.S. PATENT DOCUMENTS

| | | | |
|---|---|---|---|
| 6,311,265 | B1 | 10/2001 | Beckerle et al. |
| 6,601,058 | B2 | 7/2003 | Forster et al. |
| 6,654,952 | B1 | 11/2003 | Nair et al. |
| 6,772,398 | B2 | 8/2004 | Saluja et al. |
| 6,801,938 | B1 | 10/2004 | Bookman et al. |
| 6,832,357 | B2 | 12/2004 | Saluja et al. |
| 6,918,111 | B1 | 7/2005 | Damron et al. |
| 6,954,749 | B2 | 10/2005 | Greenblatt et al. |
| 7,080,088 | B1 | 7/2006 | Lau |
| 7,254,590 | B2 | 8/2007 | Mudunuri et al. |
| 7,299,458 | B2 | 11/2007 | Hammes |
| 7,392,514 | B2 | 6/2008 | Edwards |
| 7,467,371 | B1 | 12/2008 | Meredith et al. |
| 2002/0080181 | A1 | 6/2002 | Razdow et al. |
| 2003/0014379 | A1 | 1/2003 | Saias et al. |
| 2003/0191765 | A1 | 10/2003 | Bargh et al. |
| 2003/0200538 | A1 | 10/2003 | Ebeling et al. |
| 2004/0117772 | A1 | 6/2004 | Brand et al. |
| 2004/0123072 | A1 | 6/2004 | Kailas et al. |
| 2004/0205058 | A1* | 10/2004 | Kiji .................................. 707/3 |
| 2004/0207665 | A1 | 10/2004 | Mathur et al. |
| 2004/0225999 | A1 | 11/2004 | Nuss |
| 2005/0071359 | A1 | 3/2005 | Elandassery et al. |
| 2005/0097561 | A1 | 5/2005 | Schumacher et al. |
| 2005/0251527 | A1 | 11/2005 | Phillips et al. |
| 2005/0257194 | A1 | 11/2005 | Morrow et al. |
| 2005/0257195 | A1 | 11/2005 | Morrow et al. |
| 2006/0005173 | A1 | 1/2006 | Eng |
| 2006/0048113 | A1 | 3/2006 | Ozone et al. |
| 2006/0277392 | A1* | 12/2006 | Bittner, Jr. .................... 712/25 |
| 2008/0052687 | A1 | 2/2008 | Gonzales-Tuchmann et al. |
| 2008/0082984 | A1 | 4/2008 | McDaniel |
| 2008/0134158 | A1 | 6/2008 | Salz et al. |
| 2009/0064157 | A1 | 3/2009 | Bar-Or et al. |

OTHER PUBLICATIONS

Miyazaki, T., and Edward A.L., "Code Generation by Using Integer-Controlled Dataflow Graph"Proceedings of the 1997 IEEE Internatinoal Conference on Acoustics, Speech, and Signal Processing, vol. 1, 1997, 4 pp.

Neubauer, F., A. Hoheisel, and J. Geiler, "Workflow-based Grid Applications", © 2005 Elsevier, pp. 1-15.

Weimer, W. and G.C. Necula, "Finding and Preventing Run-Time Error Handling Mistakes", © 2004 ACM, vol. 39, No. 10, pp. 419-431.

Arvind and R.S. Nikhil, "Executing a Program on the MIT Tagged-Token Dataflow Architecture", © 1990 IEEE, pp. 300-318.

Bowers, S., B. Ludascher, A.H.H. Ngu, and T. Critchlow, "Enabling Scientific Workflow Reuse through Structured Composition of Dataflow and Control-Flow", Proceedings of the 22nd International Conference on Data Engineering Workshops, © 2006 IEEE, 10 pp.

Cardelli, L., and P. Wegner, "On Understanding Types, Data Abstraction, and Polymorphism", Computing Surveys, vol. 17, No. 4, Dec. 1985, pp. 471-522.

Kelly, P.M., P.D. Coddington, and A.L. Wendelborn, "Compilation of XSLT into Dataflow Graphs for Web Service Composition", Proceedings of the Sixth IEEE International Symposium on Cluster Computing and the Grid, © 2006 IEEE, 9 pp.

Leymann, F., and D. Roller, "Production Workflow: Concepts and Techniques", Sep. 1999, Prentice Hall PTR, 5 pp.

Morgenthal, J.P., "Enterprise Information Integration: A Pragmatic Approach", May 30, 2005, Lulu.com, 4 pp.

Morrison, J.P., "Data Responsive Modular Interleaved Task Programming System", IBM Technical Disclosure Bulletin, Jan. 1971, pp. 2425-2426.

Morrison, J.P., "Data Stream Linkage Mechanism", IBM System Journal, vol. 17, No. 4, 1978, pp. 383-408.

W3C, "XSL Transformations (XSLT) Version 2.0", [online], Jan. 23, 2007, [retrieved on Jun. 20, 2008], retrieved from the Internet at <URL: http://www.w3.org/TR/xslt20>, 50 pp.

Wikipedia, "Flow-based Programming", [online], modified Jun. 12, 2008, [retrieved on Jun. 26, 2008], retrieved from the Internet at <URL: http://en.wikipedia.org/wiki/Flow-based_programming>, 7 pp.

Wikipedia, "XML Pipeline", [online], modified Apr. 1, 2008, [retrieved on Apr. 19, 2008], retrieved from the Internet at <URL: http://en.wikipedia.org/wiki/XML_pipeline>, 4 pp.

U.S. Appl. No. 12/147,408, filed Jun. 26, 2008, entitled "Pipeline Optimization Based on Polymorphic Schema Knowledge", invented by A. Bar-Or and M.J. Beckerle, 26 pp.

Yu, D. and H. Wang, "A New Approach for the Forward and Backward Substitutions of Parallel Solution of Sparse Linear Equations—Based on Dataflow Architecture", © 1990 IEEE, pp. 621-625.

Florescu, D., C. Hillery, D. Kossmann, P. Lucas, F. Riccardi, T. Westmann, M.J. Carey, A. Sundarajan, and G. Agrawal, "The BEA/XQRL Streaming XQuery Processor", Proceedings of the 29th VLDB Conference, 2003, 12 pp.

Koch, C., S. Sherzinger, N. Schweikardt, and B. Stegmaier, "FluXQuery: An Optimizing XQuery Processor for Streaming XML Data", Proceedings of the 30th VLDB Conference, 2004, pp. 1309-1312.

LDODDS.COM, "XML Pipeline", [online], updated on Aug. 21, 2002, [retrieved on Apr. 9, 2007], retrieved from the Internet at <URL: http://www.ldodds.com/wordtin/wiki.jsp?page=XMLPipeline>, 2 pp.

Morrison, J.P., "Flow-Based Programming: A New Approach to Application Development", Van Nostrand Reinhold, New York, 1994, Chapter 10, 13 pp.

Pal, S., I. Cseri, O. Seeliger, M. Rhys, G. Schaller, W. Yu, D. Tomic, A. Baras, B. Berg, D. Churin, and E. Kogan, "XQuery Implementation in a Relational Database System", Proceedings of the 31st VLDB Conference, 2005, pp. 1175-1186.

U.S. Appl. No. 11/566,193, filed Dec. 1, 2006, entitled "System and Method for Implementing a Unified Model for Integration Systems", invented by A. Bar-Or and M.J. Beckerle.

US Patent Application, filed on Sep. 5, 2007, entitled "Compilation Model For Processing Hierarchical Data in Stream Systems", invented by A. Bar-Or and M.J. Beckerle.

* cited by examiner

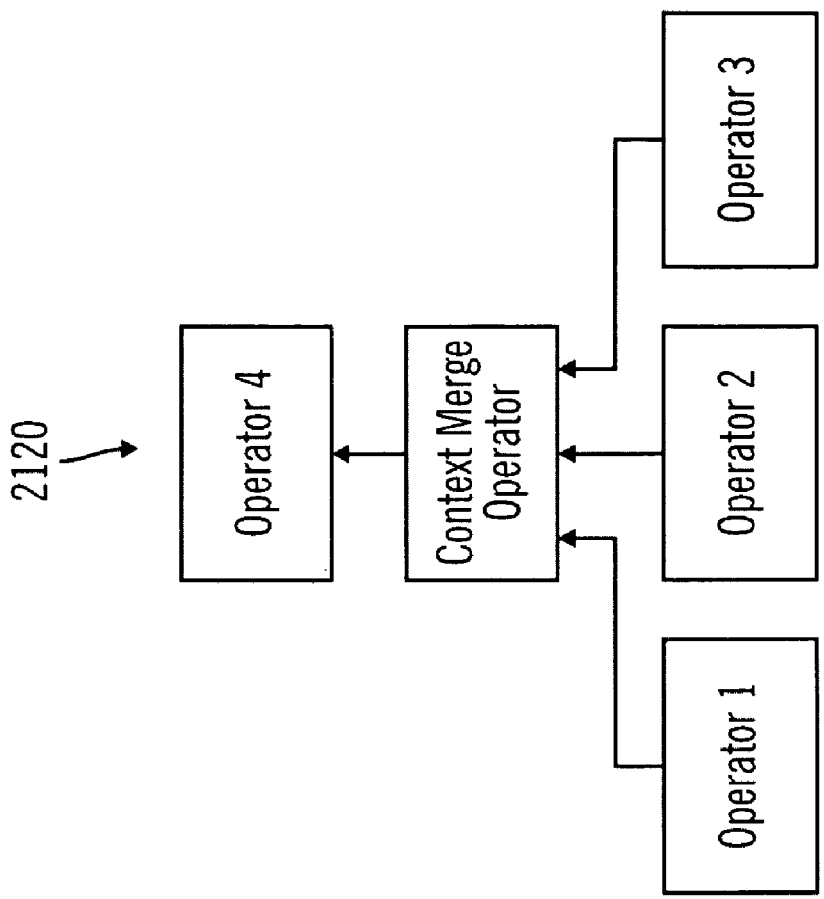
FIG. 21C
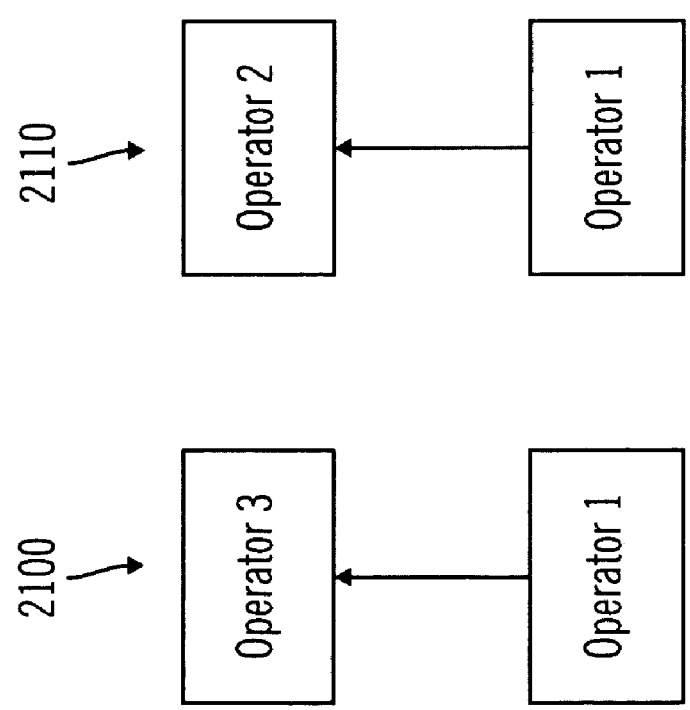
FIG. 21B
FIG. 21A

OPTIMIZATION MODEL FOR PROCESSING HIERARCHICAL DATA IN STREAM SYSTEMS

BACKGROUND

1. Field

Embodiments of the invention relate to an optimization model for processing hierarchical data in stream systems.

2. Description of the Related Art

A continuous process may be described as a process that reads from data sources and generates result data corresponding to input data as the input data becomes available. A system that runs as a continuous process is a "stream system". A stream system may be represented by a data flow diagram. The data sources may be continuous (i.e., data sources that provide data continually) or non-continuous (i.e., data sources that do not provide data continually).

Most data flow systems (also called flow-based programming systems (MORRISON,

J.P., "Flow-Based Programming: A New Approach to Application Development", Van Nostrand Reinhold, New York, 1994)) use the relational model (also called relational data model) when processing information. The relational model defines a relation as a set of data items, and each data item is composed of a set of scalar named attributes. Relational query processors define relational operators. The query also regards the data flow as a directed graph of operators in which one operator consumes the output relations of other operators and produces new relations. The relational model has many advantages that commercial databases, among others exploit. The relational model is leveraged to optimize query processing by rewriting the graphs, introducing parallelism, eliminating unnecessary computations, etc.

However, the relational model is ill-equipped to deal with hierarchical data, where items in a relation can contain non-scalar attributes such as an attribute that contains a list of attributes or an attribute that by itself is a relation.

Several languages have been designed to address hierarchical data. XQuery is a language that was built on the foundation of Structured Query Language (SQL) to support the processing of eXtensible Markup Language (XML) hierarchical documents. XML documents are a type of hierarchical data. There are many implementations that support the processing of XQuery, but only a few of them (KOCH, C., S. SHERZINGER, N. SCHWEIKARDT, and B. STEGMAIER, "FluXQuery: An Optimizing XQuery Processor for Streaming XML Data", Proceedings of the 30th VLDB Conference, 2004; FLORESCU, D., C. HILLERY, D. KOSSMANN, P. LUCAS, F. RICCARDI, T. WESTMANN, M. J. CAREY, A. SUNDARAJAN, and G. AGRAWAL, "The BEA/XQRL Streaming XQuery Processor", Proceedings of the 29th VLDB Conference, 2003; PAL, S., I. CSERI, O. SEELIGER, M. RYS, G. SCHALLER, W. YU, D. TOMIC, A. BARAS, B. BERG, D. CHURIN, and E. KOGAN, "XQuery Implementation in a Relational Database System", Proceedings of the 31st VLDB Conference, 2005) extend the relational model in order to leverage the optimization knowledge of the relational model. Exstensible Stylesheet Language Transformations (XSLT) is a transformation language that is able to transform hierarchical XML documents. XSLT is not built on top of the relational model and does not benefit from its ability to support optimizations.

However, both XSLT and XQuery are lacking the definition of a component model that allows new user-supplied operators to be added to the process designs and an assembly model that allows the creation of complex data transformations. In the data flow graphs, the operators are the components, and the flow-graphs are the "assembly" The component model may be described as the principles and software by which one can create new operators (new components) that are then assembled the same as any other operators (components). When applied to complex data transformations, languages like XSLT or XQuery tend to become very complex to understand and hence become error-prone.

Thus, there is a need in the art for optimization when processing hierarchical data.

SUMMARY OF EMBODIMENTS OF THE INVENTION

Provided are a method, computer program product, and system for hierarchical optimization. A linear processing graph is received, wherein the linear processing graph includes a plurality of operators, wherein each operator in the plurality is connected to at least one other operator by an arc, wherein hierarchical data flows on arcs, wherein the operators read and replace identified subregions within the hierarchical data flowing into the operators on the arcs, and wherein the operators do not modify the hierarchical data outside of these identified subregions. For each operator in the linear processing graph, a minimal set of dependent upstream operators on which that operator depends is found by examining how the identified subregions are created in the linear processing graph through obtaining a set of operators on which that operator depends, by analyzing dependencies carried by a set of vector nodes of the hierarchical data in an input schema of the operator, and, for each of the vector nodes, by analyzing an associated set of scalar nodes, wherein finding the minimum set of operators includes taking into consideration data preservation characteristics of the plurality of operators and taking into consideration structural-order preservation characteristics of the plurality of operators. The linear processing graph is rewritten to create a new graph that expresses dependencies based on the minimal set of dependent upstream operators for each operator.

BRIEF DESCRIPTION OF THE DRAWINGS

Referring now to the drawings in which like reference numbers represent corresponding parts throughout:

FIGS. 21A, 21B, and 21C illustrate diagrams of root operators and their leaves in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
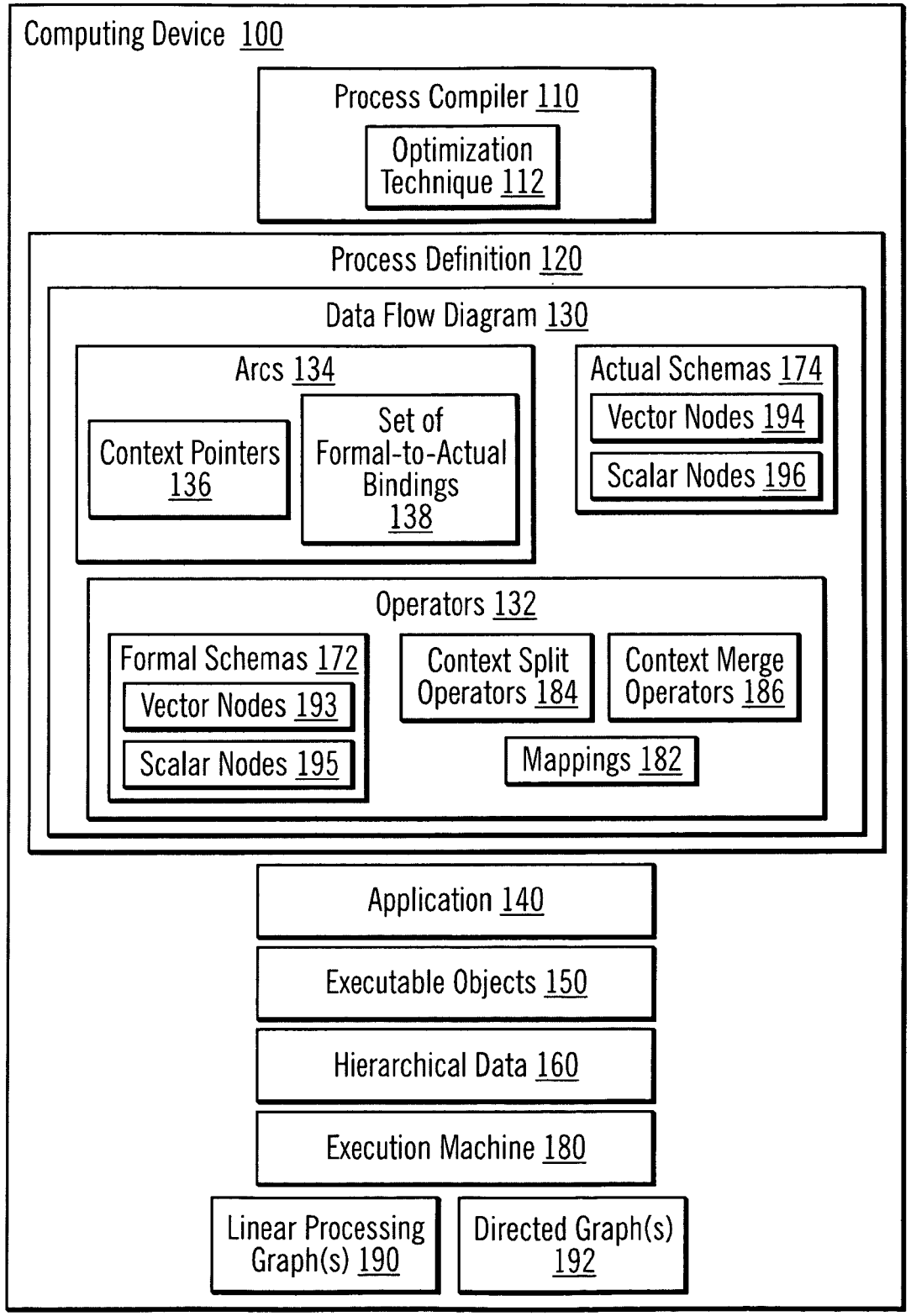
FIG. 1 illustrates details of a computing device in accordance with certain embodiments.

FIG. 1 illustrates details of a computing device 100 in accordance with certain embodiments. The computing device 100 includes a complier 110, a process definition 120, an application 140, executable objects 150, hierarchical data 160, schemas, an execution machine 180, one or more linear processing graphs 190, and one or more directed graphs 192.

The process definition 120 includes a data flow diagram 130, which includes operators 132, arcs 134, and actual schemas 174. The actual schemas 174 may be part of the process definition 120 or created when the process compiler 110 runs. Each operator 132 definition includes a formal schema 172 and mappings 182. Embodiments introduce context split operators 184 and context merge operators 186 used for optimization of the data flow diagram 130. Each arc 134 may include a context pointer 136 and a set of formal to actual bindings 138. The set of formal to actual bindings 138 are used when names do not match between formal and actual schemas 172, 174. The schemas 172, 174 include formal schemas 172 and actual schemas 174. Each of the schemas may be described as a logical description of a data type and includes a description of the hierarchical nature of the data (i.e., defines the structure of the data). Each schema 172, 174 is capable of including vector nodes 193, 194 and scalar nodes 195, 196. A formal schema 172 is defined by an operator 132 and represents the type of data that operator 132 can accept on an input arc or produce on an output arc. An actual schema 174 is defined by the data flow diagram 130 assembly and represents the type of data being supplied to the operator 132 through an arc 134. Each arc 134 has schemas that are descriptions of the structure of data, particularly, hierarchical schemas describe hierarchical data.

References to "data" herein are references to hierarchical data. Hierarchical data 160 may be described as including nested structures, which in turn may include nested repeating vector nodes 193, 194. A vector node 193, 194 may represent a vector of a complex structure that can, in turn, contain multiple scalars (represented by scalar nodes 195, 196) and vectors (represented by vector nodes 193, 194). In certain embodiments, hierarchical data 160 may be represented as a hierarchical tree data structure having sub-trees. In certain embodiments, each of the schemas has a tree structure. A node in the tree structure may represent a vector or a scalar. Each child node of a node has a unique name among the other siblings.

There are three kinds of schemas: actual schemas 174, operator input formal schemas 172, operator output formal schemas 172. An arc actual schema 174 describes the maximal information on the datatype that is available on the structure of the hierarchical data 160 that is carried by the arc 134. The operator input formal schema 172 describes minimal information of the datatype that is required by the operator 132. The operator output formal schema 172 describes the minimal information of the datatype that is output by the operator 132.

Embodiments ensure that the requirements stated by the input formal schema are met by the arc actual schema and create, on each outgoing arc 134, an actual schema 174 based on the output formal schemas 172 of those arcs and the operator input arcs actual schemas 174.

The process compiler 110 includes an optimization technique 112. The executable objects 150 represent some form of output that is suitable for execution (e.g., executable code). The process compiler 110 receives a process definition 120 as input and outputs executable objects 150 using the optimization technique 112 to optimize the process definition 120 before generating the executable objects 150. The execution machine 180 executes the executable objects 150.

Embodiments provide the process compiler 110 for compiling the process definition 120 that relies on a hierarchical data model and a component model. Embodiments allow the application 140 to be built up from operators 132 that perform relational-like operations on parts of the hierarchical data 160 in a synergistic way that does not exclude many common relational optimizations, such as data partitioning, operator re-ordering, parallelization, etc. Embodiments do not require the user to create a data flow diagram that shreds (i.e., takes apart into constituent non-hierarchical pieces) or reassembles the hierarchical data 160 in order to perform operations that involve only an inner part of the hierarchical structure of the hierarchical data 160. This greatly increases the re-usability of the operators 132 and reduces the number of operators 132 in a process design.

The compiler 100 accepts a process definition 120 as user input and compiles the process definition 120 into executable form (e.g., as executable objects 150). In certain embodiments, a process definition 120 may be described as a data flow diagram 130. A process definition 120 may be constructed from the following components: a data flow diagram 130, operators 132, and arcs 134. A data flow diagram 130 may be described as a directed graph where the vertices/boxes of the graph are called operators 132 and the arcs 134 describe directional flow of data. The data flow diagram 130 describes the data as it flows from various data sources through different operators to various data targets. Operators 132 are able to read data from an external resource, write data to an external resource, and/or apply data transformations while doing so. In general, operators 132 are able to consume data from every incoming arc and can produce data on every outgoing arc. Operators 132 define formal schemas 172 for each input and output arc. A formal schema 172 may be described as a definition of requirements that the actual schema should meet. Arcs 134 represent flow of data between two connected operators 132. Data that flows on the arc 134 is associated with an actual schema 174 that defines the structure of the data.

Embodiments describe an optimization technique 112 that improves the performance of a hierarchical processing pipeline (e.g., an XML pipeline [such as one described in FluX-Query: An Optimizing XQuery Processor for Streaming XML Data, C. Koch et. al.]). In certain embodiments, the optimization may be implemented on top of a hierarchical compilation model which was described in U.S. Patent Application 11/850,589, filed on Sep. 5, 2007, titled "Compilation Model for Processing Hierarchical Data in Stream Systems" by Amir Bar-or et al., SVL920070052US1, which is incorporated by reference herein.

Embodiments describe an optimization technique 112 used when compiling process definitions 120. A processing graph is a directed graph of connected components. Components implement the processing logic and have inputs and outputs. The optimization technique 112 provided by embodiments allows a user to create simple linear processing graphs 190 (i.e., pipelines), while ignoring any performance considerations. However, the execution of the pipelines is done efficiently by considering the true dependencies of the components.

Figure 2:
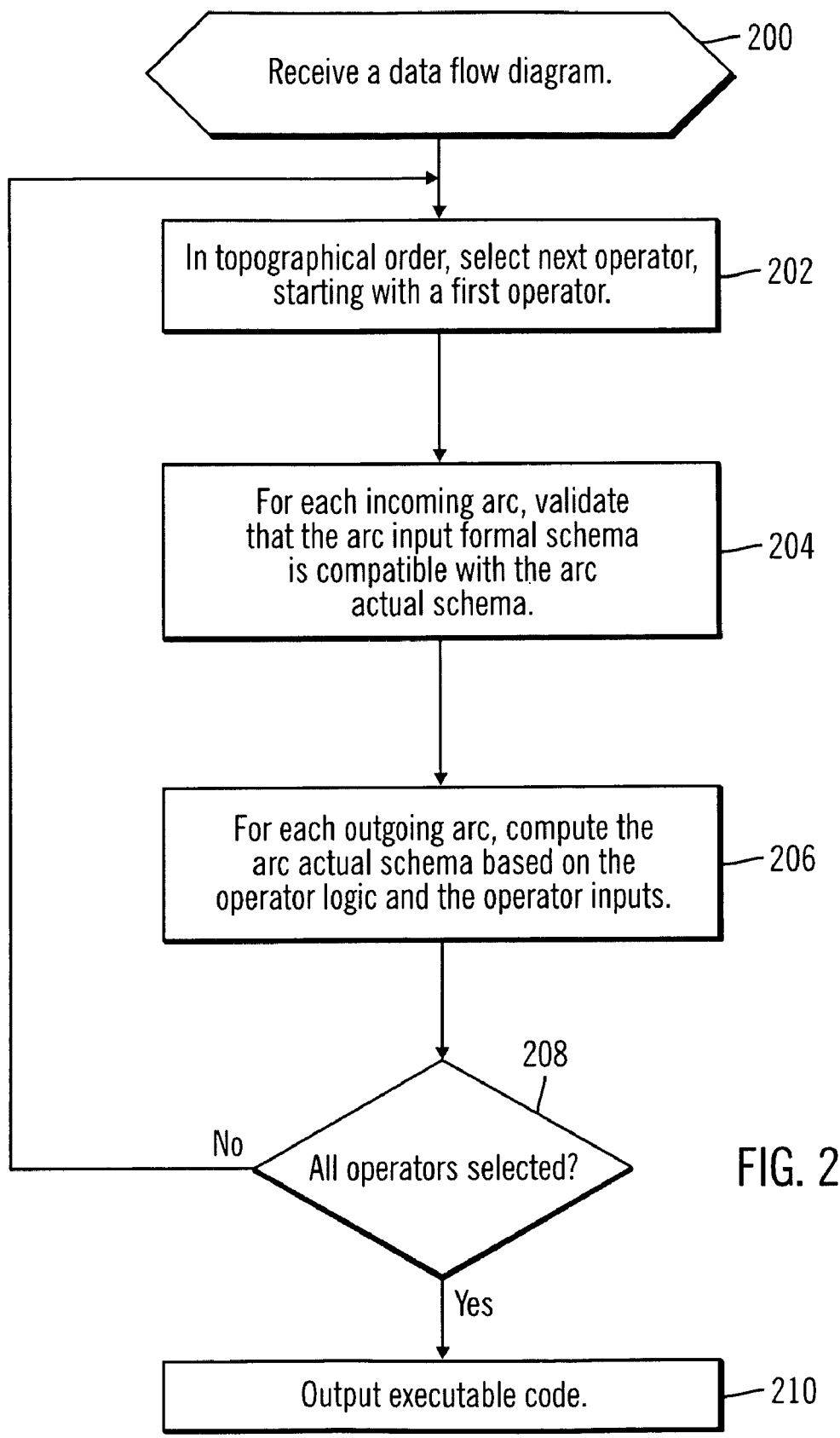
FIG. 2 illustrates logic performed by a compiler in accordance with certain embodiments.

FIG. 2 illustrates logic performed by the process compiler 110 in accordance with certain embodiments. Control begins at block 200 with the process compiler 110 receiving a process definition 120 in the form of a data flow diagram 130. In block 202, the process compiler 110 selects a next operator 132 in the data flow diagram 130, starting with a first operator 132, in topographical order consistent with data flow order (e.g., some order consistent with the directions of the arcs). In block 204, for each incoming arc 134 of the operator 132, the process compiler 110 validates that the operator input formal schema 172 is compatible with the arc actual schema 174. For example, the formal schema 172 may describe a "ID_number", and the actual schema 174 may describe "department ID" or "employee ID". In this example, an actual schema 174 describing "department ID" is compatible with a formal schema describing "ID number" however, since the names of the nodes don't match, the arc can contain a set of formal-to-actual bindings 138 which specify exactly which actual input node is to match a formal node. In block 206, for each outgoing arc 134 of the operator 132, the process compiler 110 computes the arc actual schema 174 based on the operator logic and the operator inputs. In block 208, the process compiler 110 determines whether all operators 132 have been processed. If so, processing continues to block 210, otherwise, processing loops back to block 202 to select another operator 132. In block 210, the process compiler 110 outputs executable objects 150. Execution carries out the transformations on the actual data that are described by the actual schemas and the operators with their formal and actual schemas.

The actual schema describes hierarchical data 160 represented as a hierarchical data structure, and embodiments extend the logic of FIG. 2 with the following hierarchical abilities:

1. An operator 132 can operate on any part of the actual schema 174 without the extraction/promotion of the required part as a separate hierarchical or non-hierarchical data item.

2. The output of an operator 132 is recombined with the untouched parts of the input without additional expression by the user and with low or no execution cost.

3. An operator 132 is not aware and does not operate on any data that is not described by the operator input formal schema 172 even if the data is described in the incoming arc actual schema 174. This property allows the operator to be highly reusable in that different instances of the operator 132 can manipulate parts within the hierarchy of data in the application.

The hierarchical abilities are achieved with context nodes and context preservation. With reference to a context node, in the process definition 120, each arc 134 contains a context pointer 136 defined by a user as part of the process definition. The context pointer 136 points to a context node in an actual schema tree of the arc 134. That is, the context pointer 136 points to data that the operator 132 is to consume. By default, the context pointer 136 points to the root of the actual schema tree. With reference to context preservation, for each outgoing arc 134, an operator 132 sets a single incoming arc 134 as the arc context source so that it is unambiguous which input arc's context is being preserved to each output.

Figure 3:
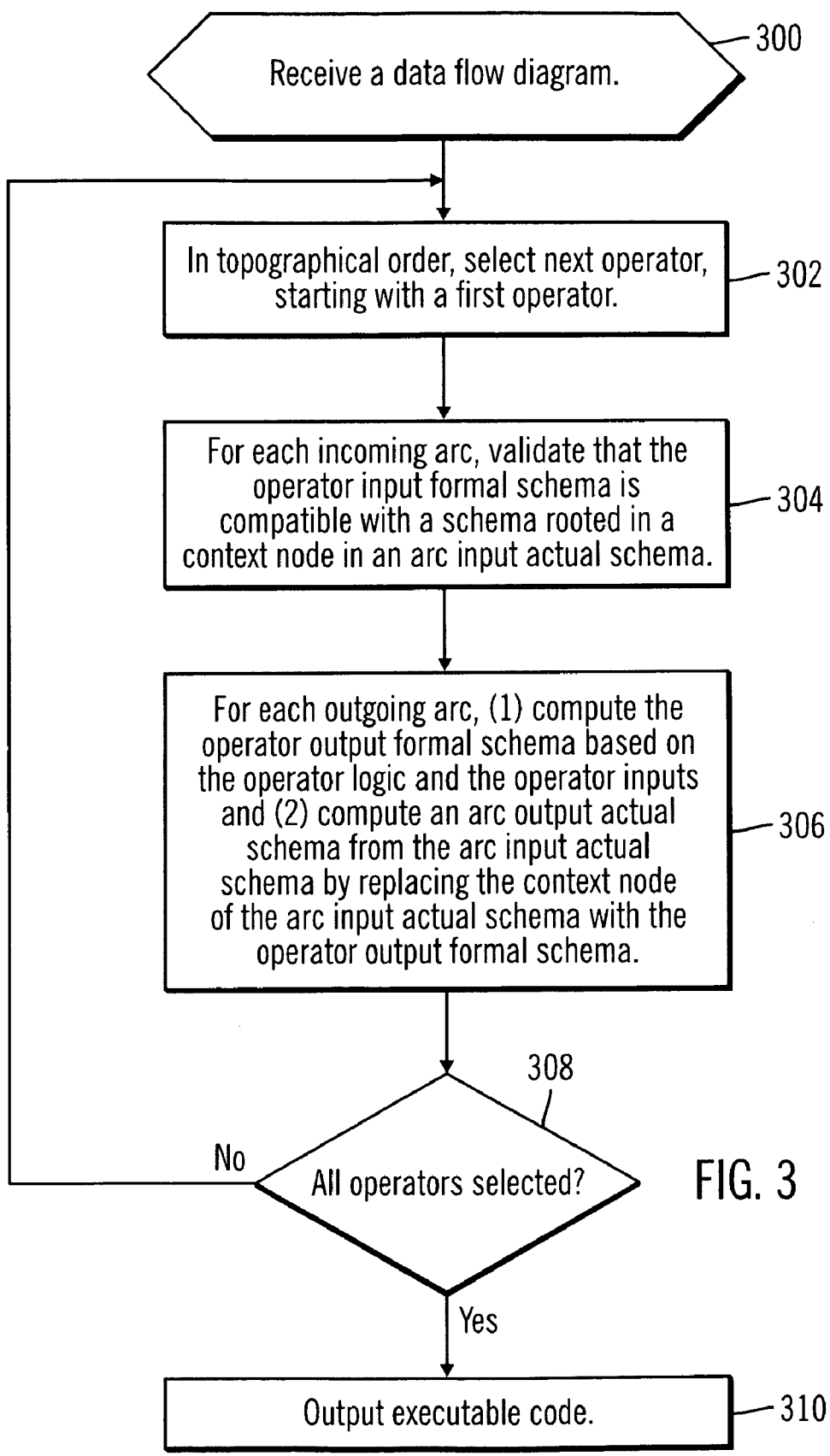
FIG. 3 illustrates logic performed by a compiler to achieve hierarchical abilities in accordance with certain embodiments.

FIG. 3 illustrates logic performed by the process compiler 110 to achieve the hierarchical abilities in accordance with certain embodiments. Control begins at block 300 with the process compiler 110 receiving a process definition 120 in the form of a data flow diagram 130. In block 302, the process compiler I 10 selects a next operator 132 in the data flow diagram 130, starting with a first operator 132, in topographical order consistent with data flow order (e.g., some order consistent with the directions of the arcs). In block 304, for each incoming arc 134 of the operator 132, the process compiler 110 validates that the operator input formal schema 172 is compatible with the schema rooted in the context node in an arc input actual schema (that is, the portion of the actual schema that the context pointer 136 points to which includes the context node and all nodes beneath it in the hierarchical data, which are called child nodes). In certain embodiments, the validation either matches names of the arc input formal schema 172 and the schema rooted in the context node in the arc input actual schema 174. In certain embodiments in which names do not match, the validation uses a set of formal-to-actual bindings 138 that can be on the arc as part of the process design to match the arc input formal schema 172 and the schema rooted in the context node in the arc input actual schema 174. In block 306, for each outgoing arc 134 of the operator 132, the process compiler 110 (1) computes an operator output formal schema 172 based on the operator logic and the operator inputs (e.g., data pointed to by a context pointer 136 in an actual schema of an incoming arc) and (2) computes an arc output actual schema 174 from the arc input actual schema by replacing the context node of the arc input actual schema with the operator output formal schema 172. In block 308, the process compiler 110 determines whether all operators 132 have been processed. If so, processing continues to block 310, otherwise, processing loops back to block 302 to select another operator 132. In block 310, the process compiler 110 outputs executable objects 150.

In certain embodiments, a schema is a tree structure made up of nodes. Each node has a name, type, and dimensionality (vector or scalar). The type can be a number, character string, date, time, or can be a group containing multiple other "nodes" that can themselves contain multiple other nodes, and so on.

Figure 4:
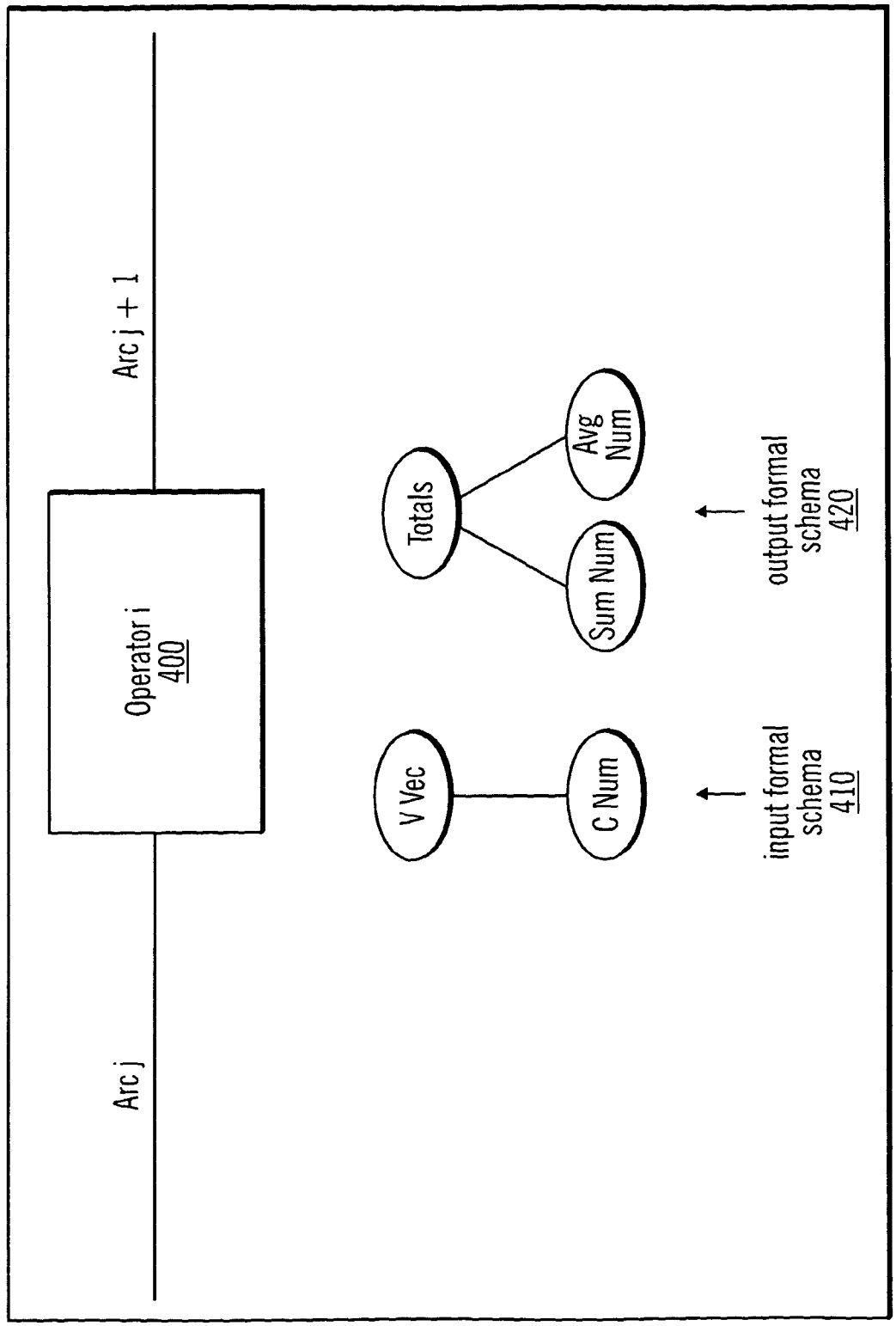
FIGS. 4-8 illustrate an example of compiling a process in accordance with certain embodiments.

FIGS. 4-8 illustrate an example of compiling a process in accordance with certain embodiments. FIG. 4 illustrates an operator 400 in a graph with an operator input formal schema 410 and an operator output formal schema 420. In FIG. 4, the rest of the operators of the graph are omitted for simplicity. The operator 400 is expecting a vector ("V Vec" node in the operator input formal schema 410) that consists of one attribute "c" that can be any number type ("C Num" node in the operator input formal schema 410). The operator 400 produces a totals node ("Totals" node in the operator output formal schema 420) that contains a sum attribute ("Sum Num" node in the operator output formal schema 420) and an average attribute ("Avg Num" node in the operator output formal schema 420).

Figure 5:
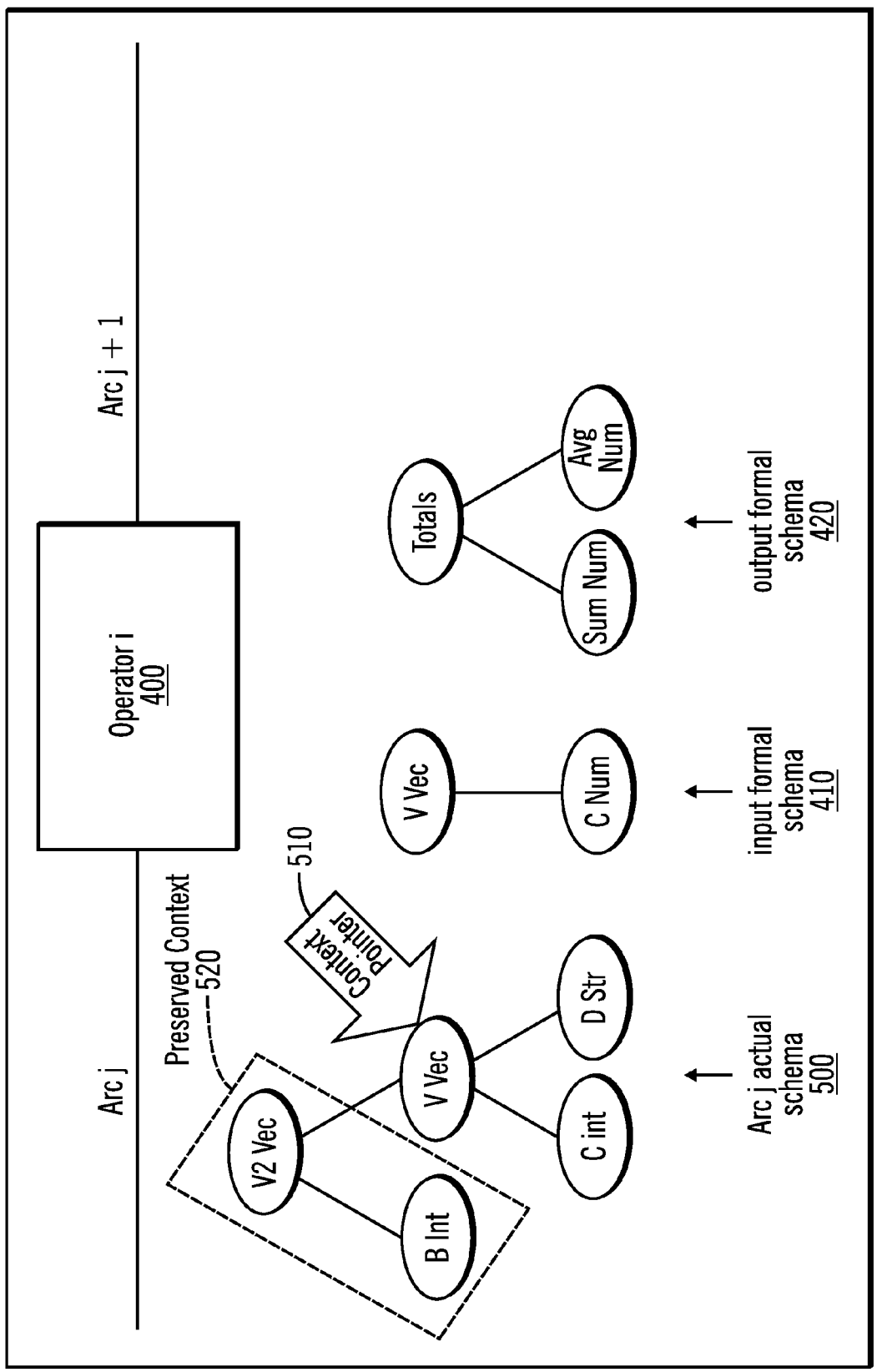

FIG. 5 illustrates an actual schema 500 computed from an upstream operator and a context pointer 510 that is established by the user as part of design of the process definition 120. When the process compiler 110 successfully compiles the upstream operator, i.e., an operator that precedes operator 400, the process compiler 110 computes the actual schema 500 for arc j. When using an operator to create a process, the user sets the context pointer 510 of Arc j, which designates the part of the data that is to be operated on by operator 400. Also, the "A" and "B int" nodes represent preserved context 520.

Figure 6:
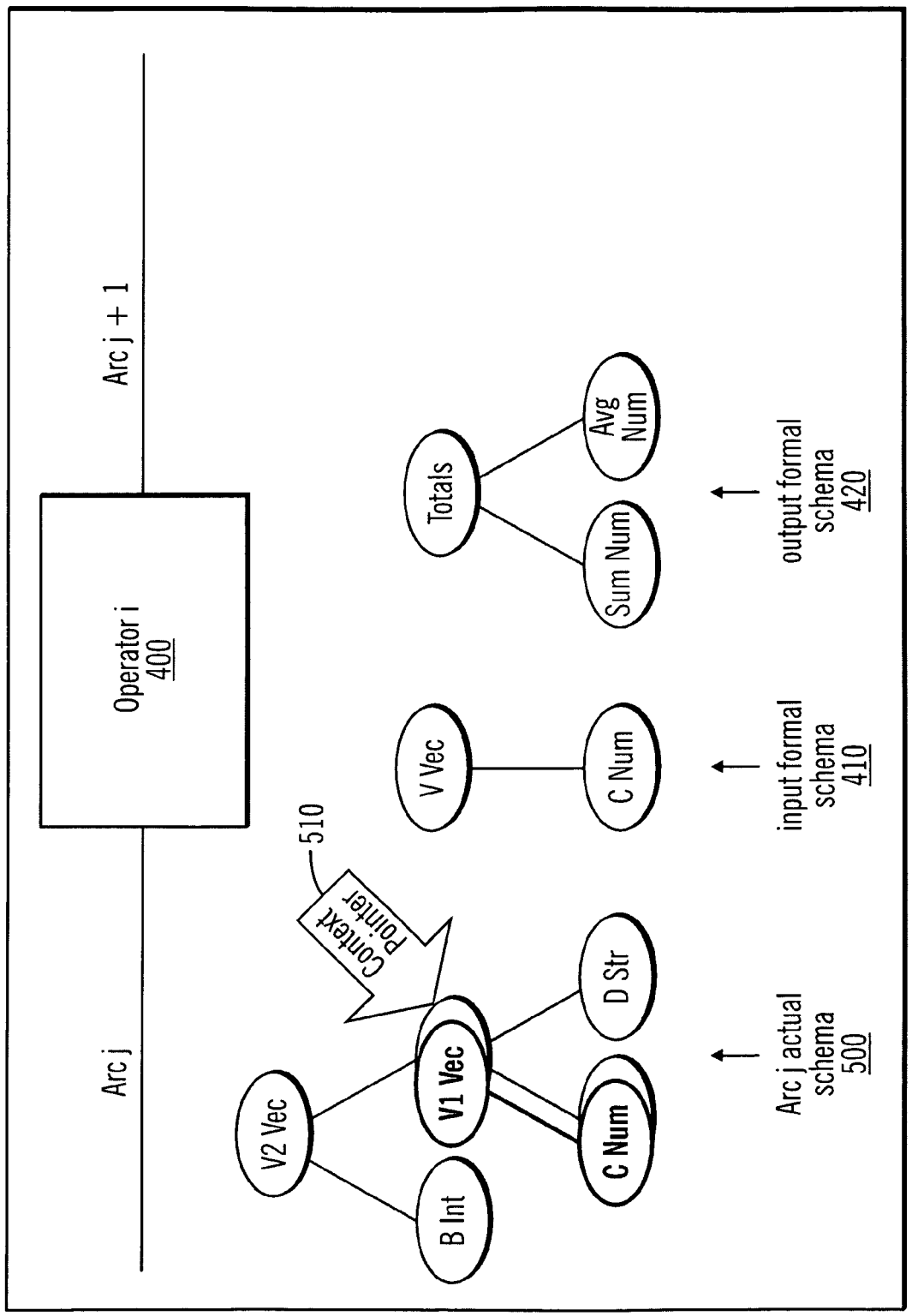

FIG. 6 illustrates checking for compatibility between the actual schema 500 under the context pointer 510 and the operator input formal schema 410 (which is the processing of block 304 of FIG. 3). In this example, the actual schema 500 and the operator input formal schema 410 are compatible in that the operator input formal schema 410 is a generalization of the actual schema 500 identified by the context pointer 510. In particular, the "V Vec" and "C Num" nodes of the operator input formal schema 410 are compatible with the "V Vec" and "C int" nodes in the actual schema 500 for arc j. Whether the "D Str" node of the actual schema 500 makes it to the output actual schema 800 (FIG. 8) depends on the operation of the operator 400.

Figure 7:
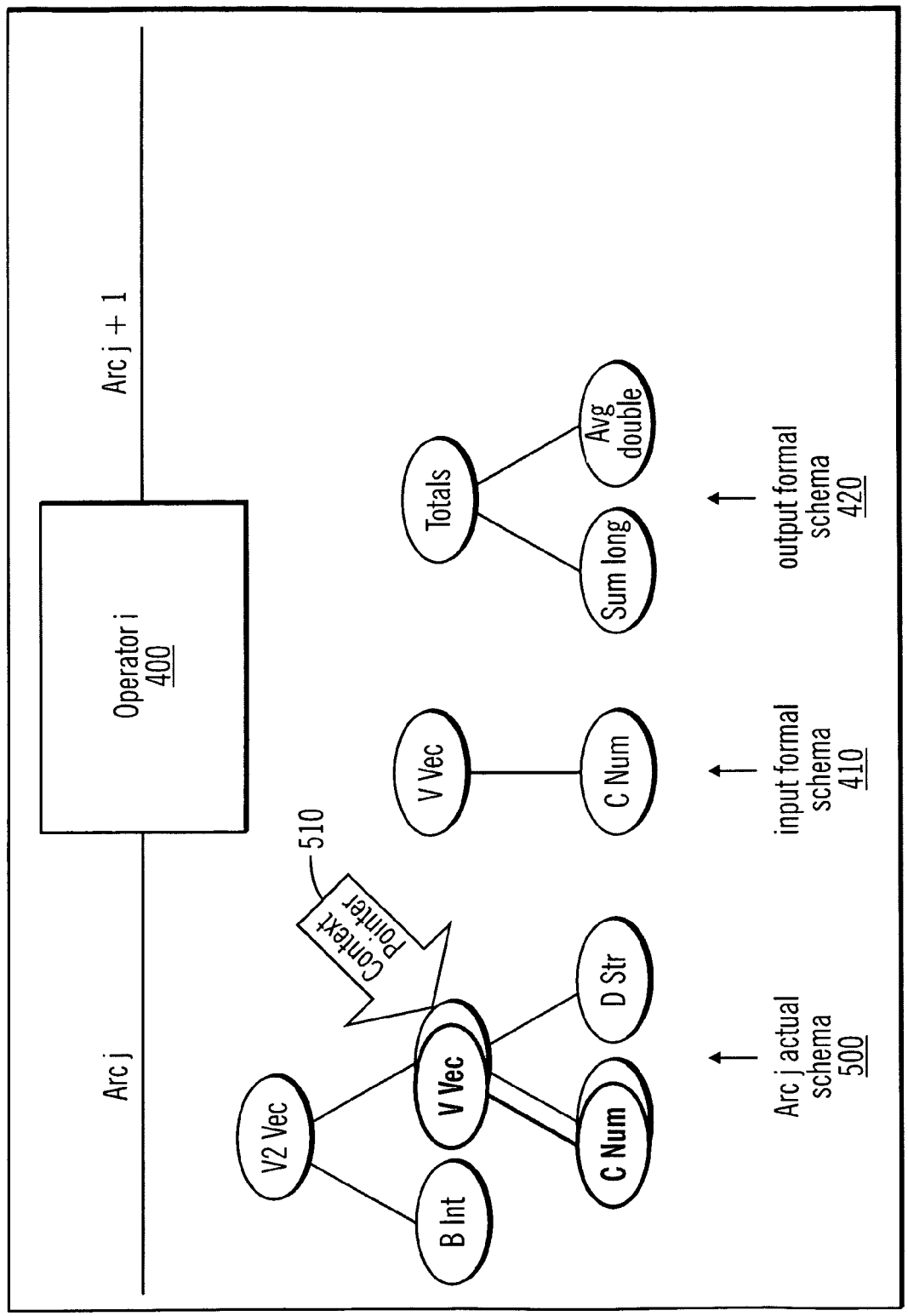

FIG. 7 illustrates computing an arc output formal schema 420 (which is a portion of the processing of block 306 of FIG. 3). In particular, the arc output formal schema 420 is modified so that the "Totals", "Sum Num", and "Avg Num" nodes of the arc output formal schema 420 become "Totals", "Sum long", and "Avg double" nodes.

Figure 8:
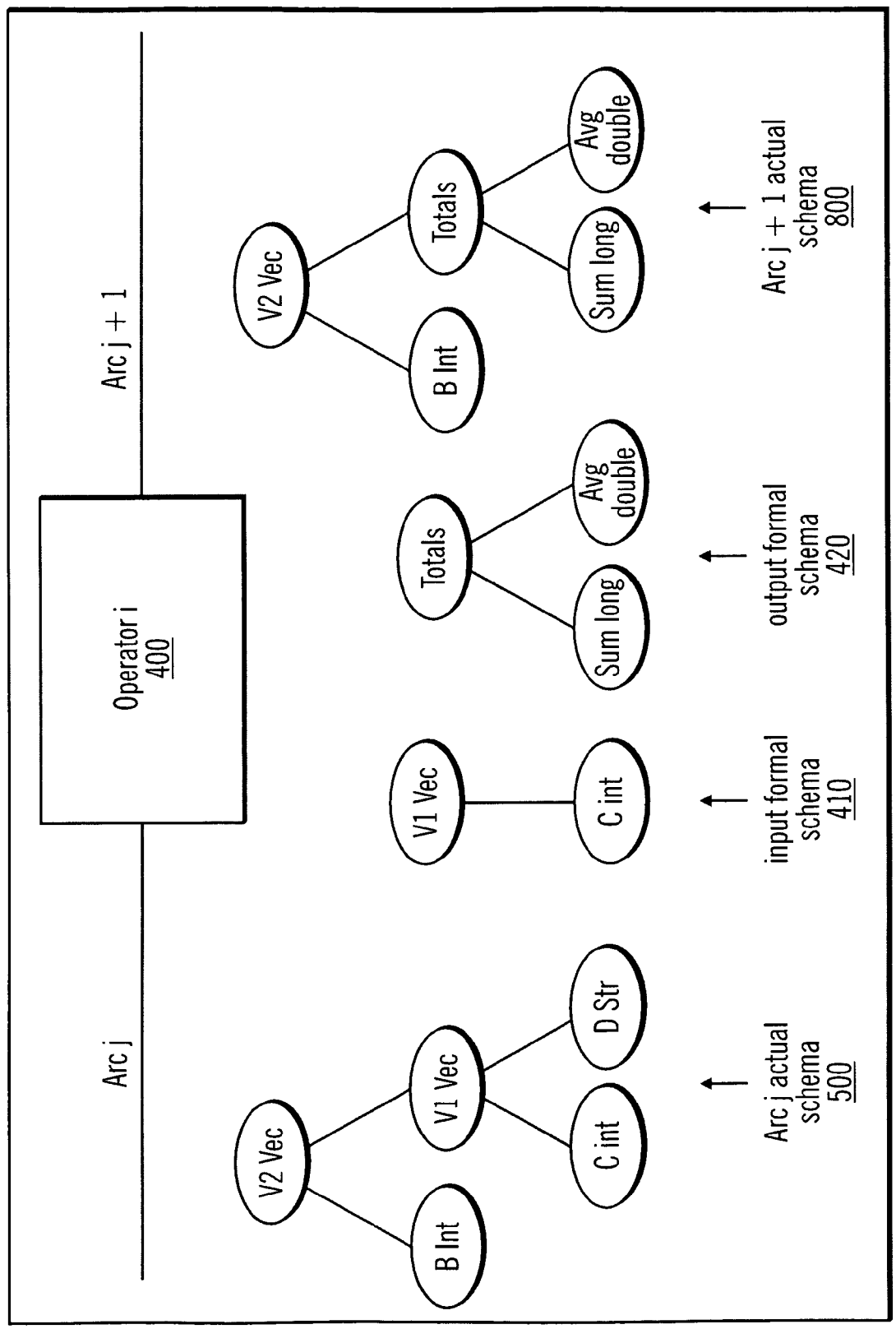

FIG. 8 illustrates computation of the actual schema 800 for arc j+1 (which is a portion of the processing of block 306 of FIG. 3). In particular, the "V vec" node and "C Num" node of the arc input formal schema 410 are replaced by the "V1 vec" node and the "C int" node of the actual schema 800 to give the operator access to those parts of the data described by the corresponding parts of the actual input schema. Also, the actual schema 800 is generated by replacing the "V1 Vec", "C int", and "DStr" node group of the actual schema 500 for arc j with the arc output formal schema, which has "Totals" "Sum long", and "Avg double" nodes of the arc output formal schema 420.

Notice that the operator 400 was not aware of the existence of the "V2" and "B" nodes and did not change their value, but these nodes are still available for the downstream (following) operator. Also, in a different process definition, the same operator (same code and same logic of FIG. 3) may be used to operate on "V2" and "B" instead of "V1" and "C", thus creating sums of "B" rather than "C". This shows the reusability of the operator 132 for different points of the hierarchy. Thus, the arc j+1 actual schema 800 was computed for the preceding operator 400.

An operator 132 may or may not have a polymorphic mapping 182 of an node to the output as part of the function that the operator 132 computes. If the operator 132 does have such a mapping 182, then all members of an node are preserved.

Figure 9:
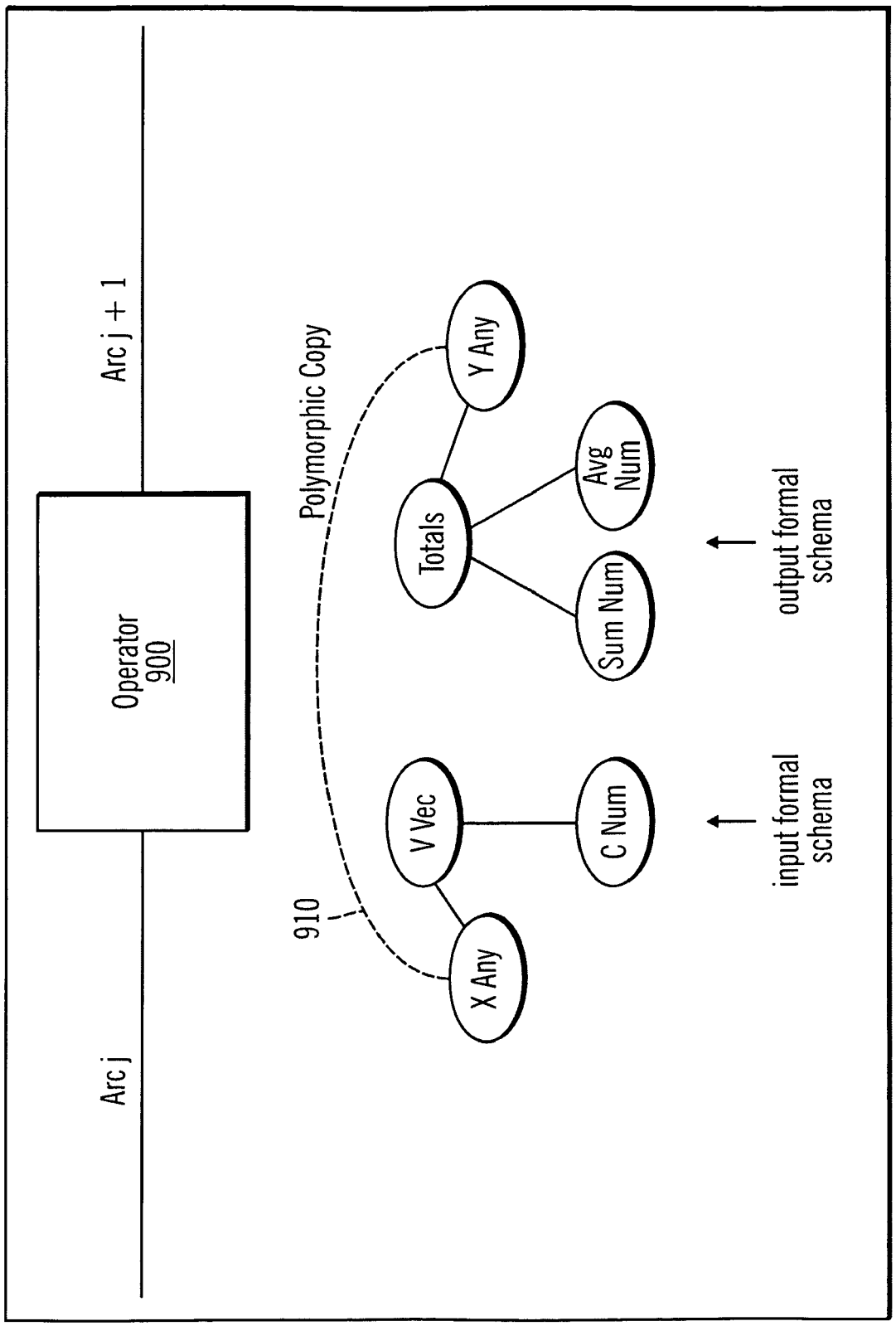
FIGS. 9-13 illustrate an example of polymorphic copy in accordance with certain embodiments.
Figure 10:
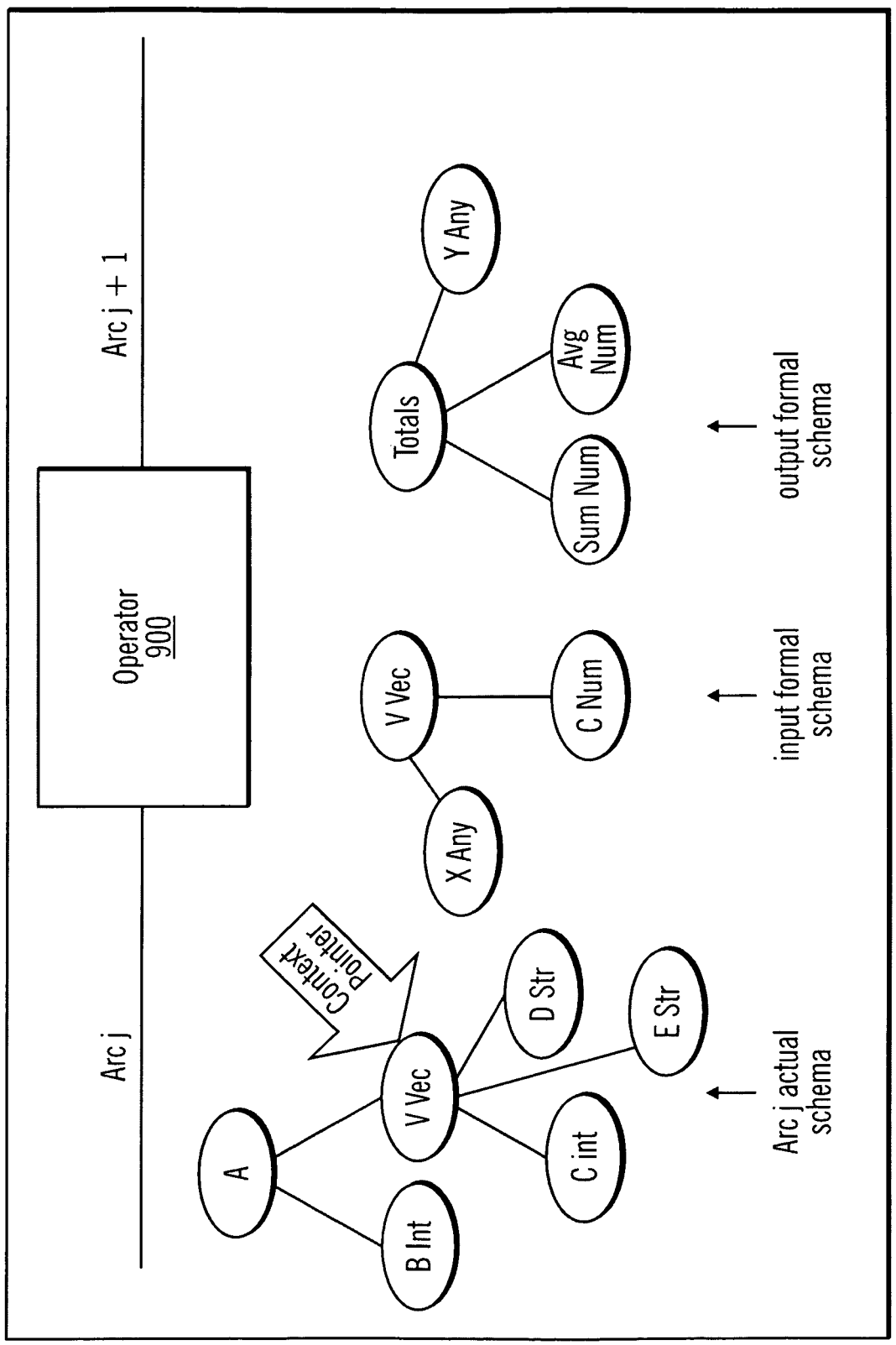
Figure 11:
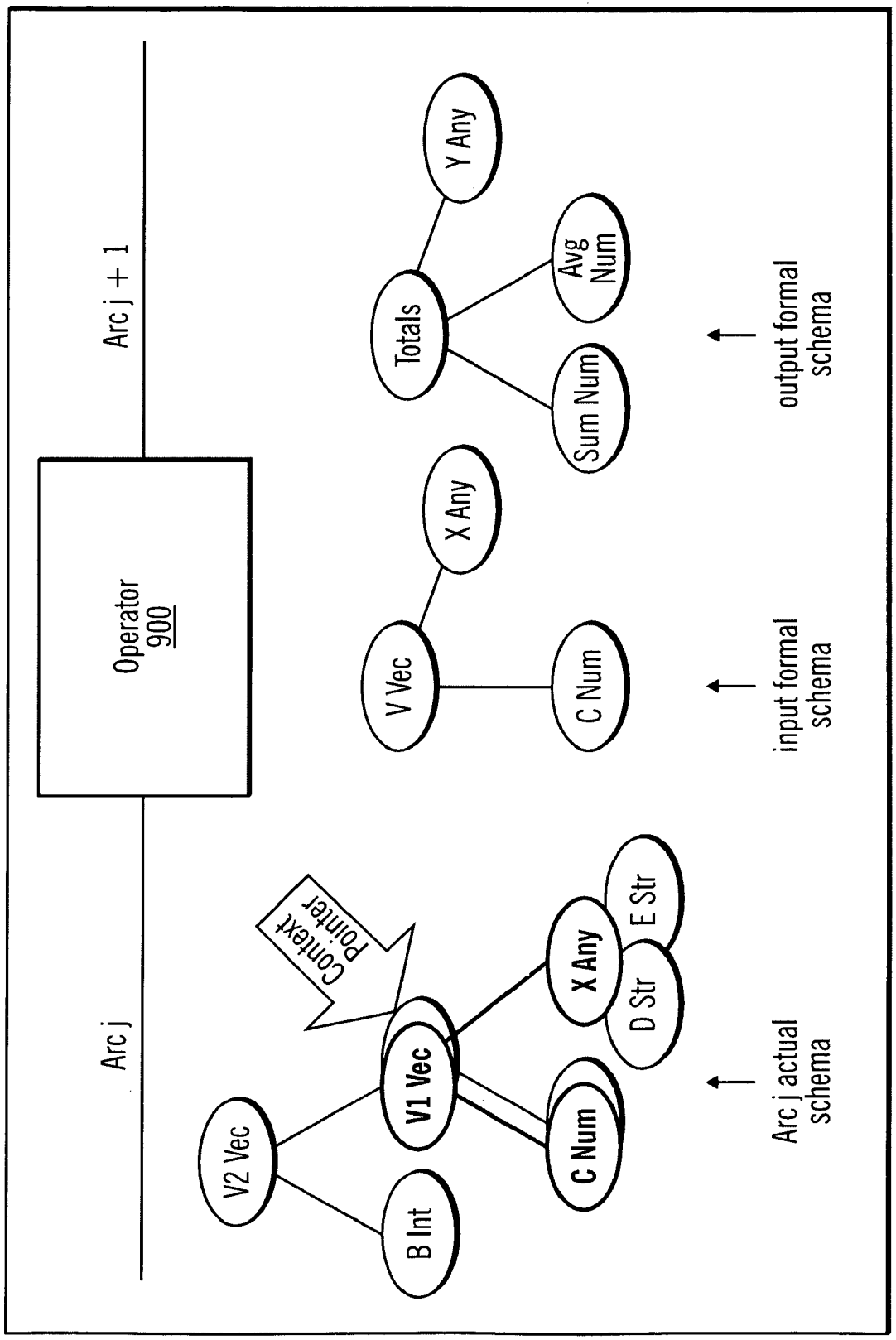
Figure 12:
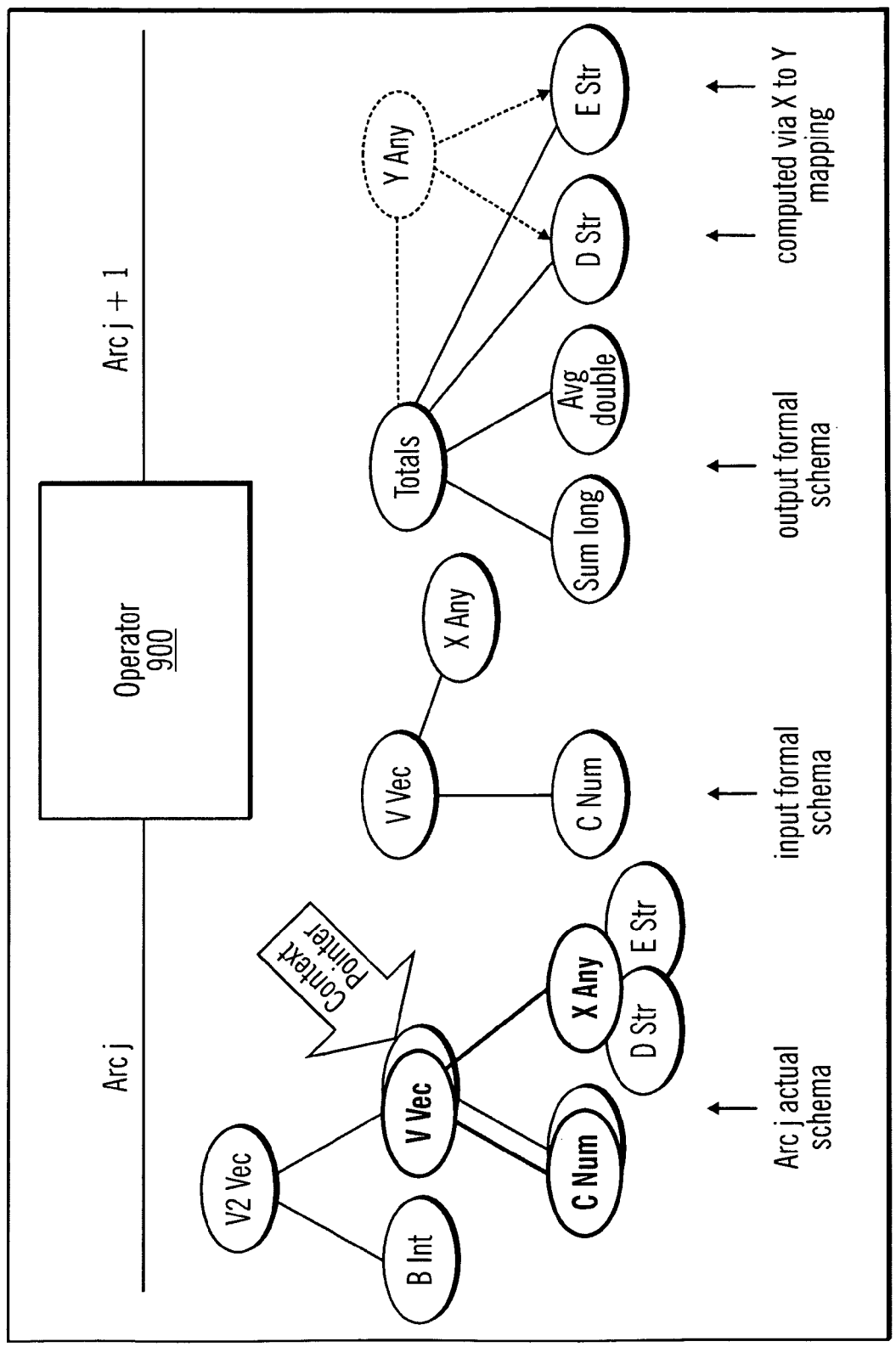
Figure 13:
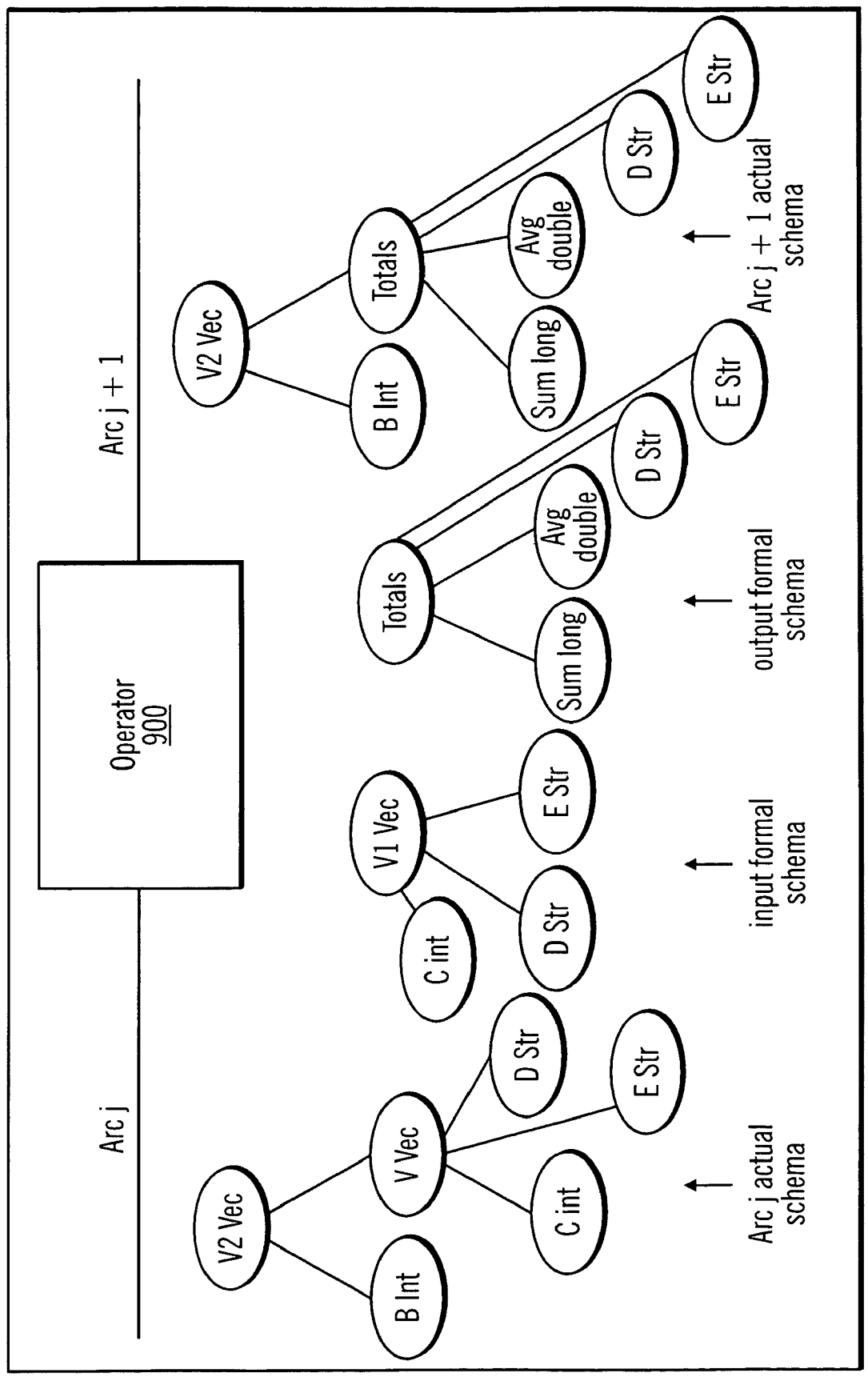

FIGS. 9-13 illustrate an example of polymorphic copy for operator 900 in accordance with certain embodiments. In FIG. 9, polymorphic copy is expressed via the X to Y mappings 910 part of the operator 900 definition. The X to Y mappings 910 are represented by the "X Any" and "Y Any" nodes. In FIG. 10, the arc j actual schema is shown, in which the "V Vec" node has members "C int", "D Str", and "E Str". In FIG. 11, the "X Any" node becomes the representative of both the "D Str" and "E Str" nodes descending from the "V1 Vec" node. In FIG. 12, under the "Totals" node, the "D Str" and "E Str" nodes are computed via the X to Y mapping. In FIG. 13, the "D Str" and "E Str" nodes replace the "X any" node and are included in the arc j+1 actual schema.

So to clarify, there really are two ways that nodes are preserved. One is by being outside the context where the operator 132 works entirely (i.e., the operator 132 does not see the nodes at all (e.g., "B int" and "V2 Vec" in FIG. 13)). The other is by being explicitly mapped to the output of the operator with a polymorphic copy operation (e.g., "D Str" and "E Str" in FIG. 13).

Thus, embodiments enable compiling transformations on nodes of hierarchical data structures "in place" while they reside inside a preserved part of the larger hierarchical data structure and enable operators 132 that may not know how to deal with a large and complex hierarchical data structure to operate on a node within the hierarchy without dismantling the hierarchy.

Embodiments combine data flow semantics and hierarchical schemas while facilitating reusable relational operators as software components since relational data is a subset of hierarchical data 160.

Within embodiments, data consisting of context (not seen by the operator) and input (seen by the operator) are carried over into the output where more operators 132 that are interested in that same input data or the surrounding context data can be encountered in the flow. This facilitates the approach of creating linear graphs in which business logic is applied in logical sequential steps. This linear style reduces the complexity of the business process but may also create false dependencies between operators 132 that can reduce execution performance.

Embodiments take a linear processing graph 190 of components and rewrite the linear processing graph 190 into a directed graph (DG) 192 in a way in which the false dependencies between the operators 132 are eliminated.

The optimization technique 112 receives an original linear processing graph 190, eliminates false dependencies while maintaining correctness of the original linear processing graph 190, and outputs a new directed graph 192 containing context split and context merge operators that produces the same result as the original linear processing graph 190. In addition, the optimization technique 112 minimizes the number of context split and context merge operators in the new DG graph 192.

Figure 14:
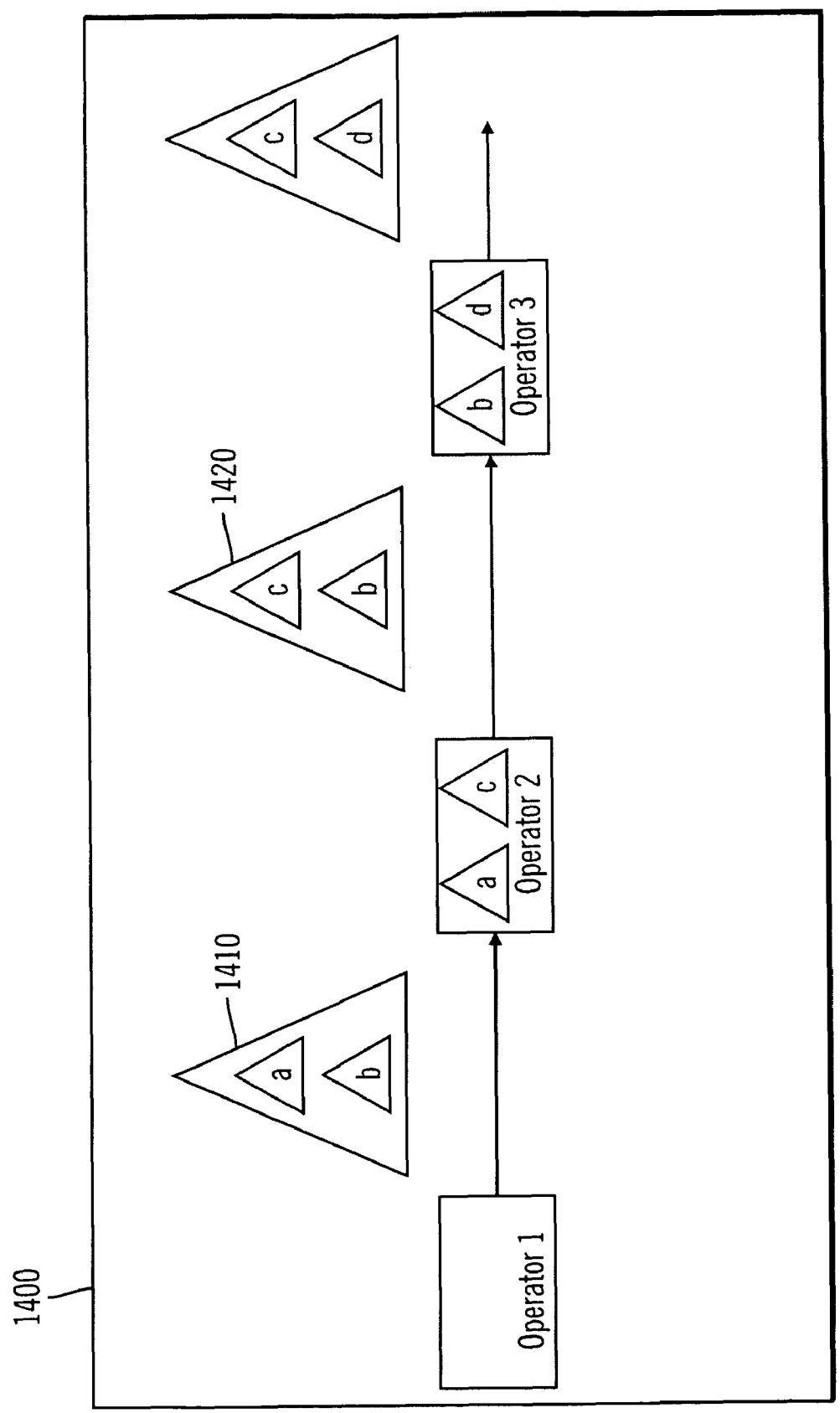
FIG. 14 illustrates a linear processing graph in accordance with certain embodiments.

FIG. 14 illustrates a linear processing graph 1400 in accordance with certain embodiments. Triangles represent input and output schemas. In FIG. 14, operator 3 has an input schema 1420 which is referencing a portion (i.e., node "b") of the output schema 1410 from operator 1 that has not been changed by operator 2. Therefore, there is a false dependency between operator 2 and operator 3. The optimization technique 112 is used to rewrite the linear processing graph 1400 and eliminate this false dependency.

Figure 15:
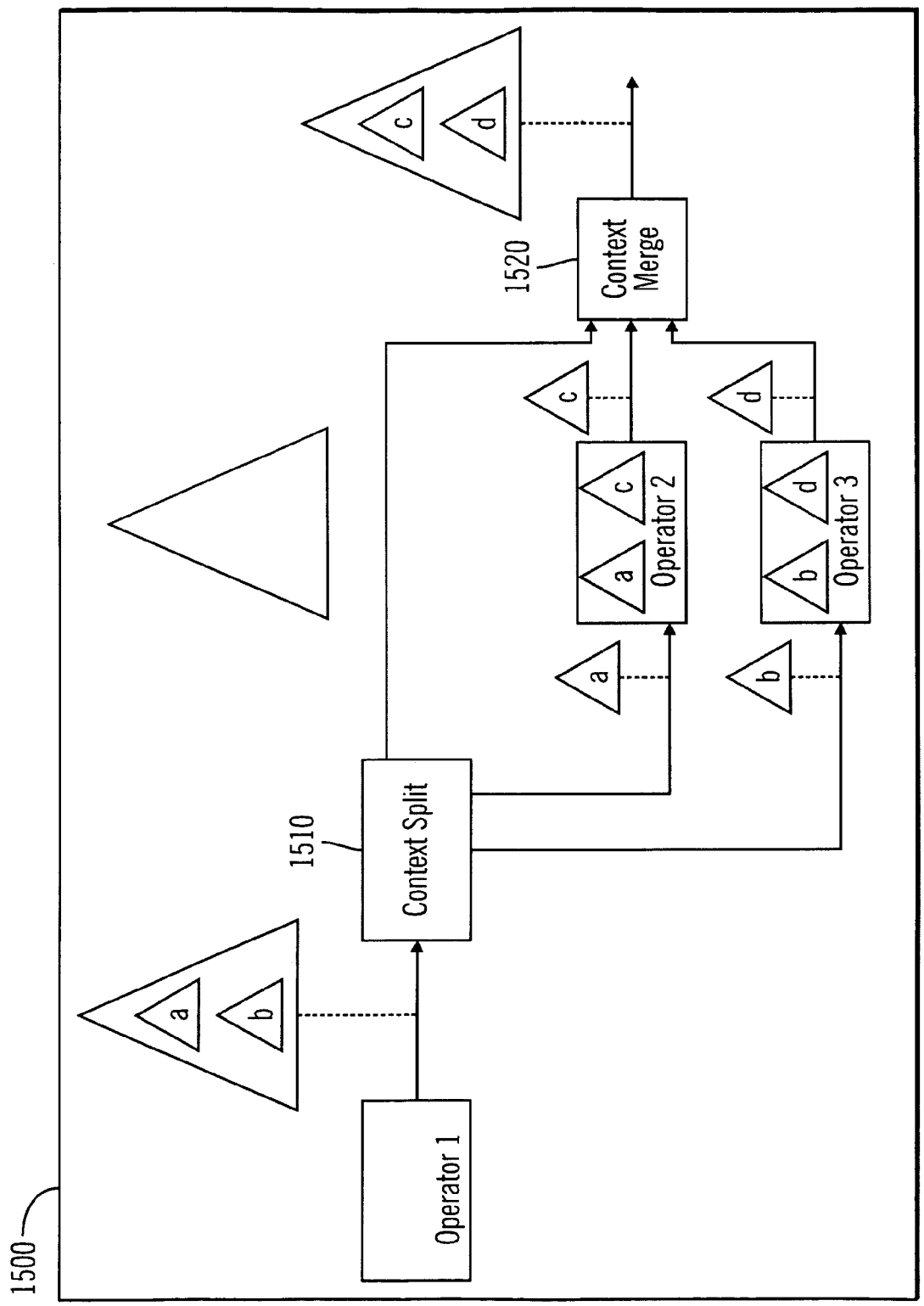
FIG. 15 illustrates an optimized graph without false dependencies in accordance with certain embodiments.

FIG. 15 illustrates an optimized graph 1500 without false dependencies in accordance with certain embodiments. Notice that operator 2 and operator 3 have distinct connections to operator 1, and, therefore, operator 3 does not depend on the execution of operator 2. In addition, the context split operator 1510 provides just the information that is required for each operator (operator 2 and operator 3), and the context merge operator 1520 merges the output of operator 2 and operator 3 into a final result, as needed to preserve the behavior of linear processing graph 1400.

The correctness criterion for the optimization technique 112 is a data preservation property. For data preservation, as to vectors, if the order and the number of input items are identical to the order and the number of the output items, the input vector is preserved. For data preservation, as to scalars, if the input scalar value is identical to the output scalar value and the parent vector is preserved, than the input scalar value is preserved.

Based on this, the optimization technique 112 finds the operators 132 that are the origin for the data needed by each other operator 132 and connects them directly. The optimization is feasible because of the following assertions: data preservation can be determined from the arc connection and operator context preservation characteristics; a technique called the bracket model (i.e., a way to describe hierarchical data as a list using brackets) allows low-cost splitting and merging of hierarchical schemas; and operators 132 are oblivious to the context data surrounding their input data.

Figure 16:
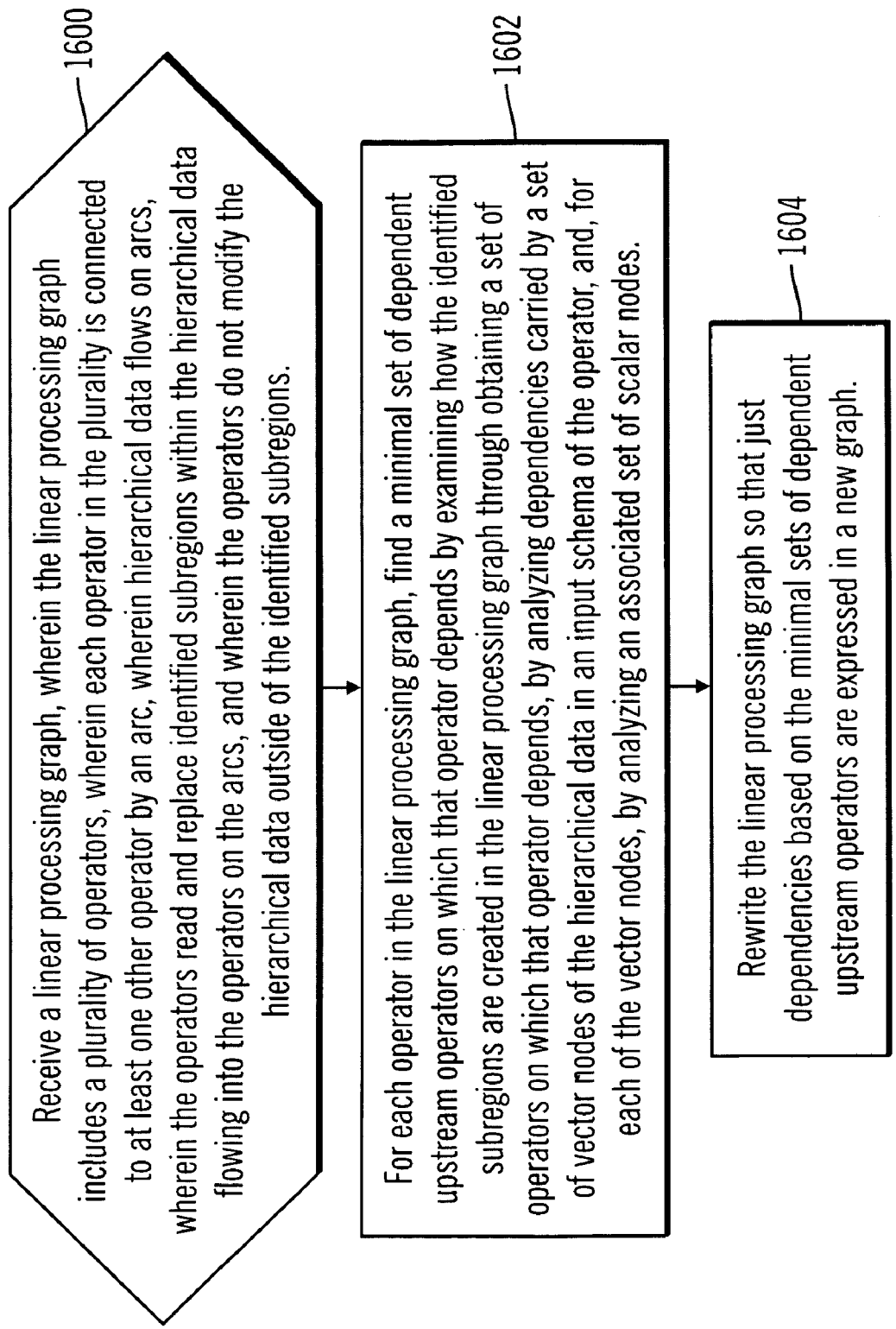
FIG. 16 illustrates logic performed by a compiler using an optimization technique in accordance with certain embodiments.

FIG. 16 illustrates logic performed by the process compiler 110 using the optimization technique 112 in accordance with certain embodiments. Control begins at block 1600 with the process compiler 110 receiving a linear processing graph 190. The linear processing graph 190 includes a plurality of operators 132, wherein each operator 132 in the plurality is connected to at least one other operator 132 by an arc 134, wherein hierarchical data 160 flows on arcs 134, wherein the operators 132 read and replace identified subregions within the hierarchical data 160 flowing into the operators 132 on the arcs 134, and wherein the operators 132 do not modify the hierarchical data 160 outside of the identified subregions. In certain embodiments, the hierarchical data may be represented by a hierarchical tree data structure, and the subregions may be sub-trees of the hierarchical tree data structure.

In block 1602, for each operator 132 in the linear processing graph 190, the process compiler 110 finds a minimal set of dependent upstream operators 132 on which that operator 132 depends by examining how the identified subregions are created in the linear processing graph 190 through obtaining a set of operators 132 on which that operator 132 depends, by analyzing the dependencies carried by a set of vector nodes of the hierarchical data 160 in an input schema of the operator 132, and, for each of the vector nodes, by analyzing its associated set of scalar nodes.

In block 1604, the process compiler 110 rewrites the linear processing graph 190 so that just the dependencies based on the minimal sets of dependent upstream operators are expressed in a new graph (e.g., a DG 192).

To find the minimal set of dependent upstream operators for each operator 132, the optimization technique 112 requires that operators 132 provide information on whether the data of an output node originates in the input data or is computed by the operator 132. Embodiments of the optimization technique 112 use this information to create ValueIDs (Value Identifiers) based on the following definition:

1. A ValueID structure contains a unique identifier (UID) number and an operator reference called the valueOrigin. ValueIDs are used to label the nodes (scalar and vector) of schemas in order to indicate when values are the same or different, and where (i.e., at what operator) values originated in the flow graph.

2. Scalars: If an output scalar schema node contains the same value as the input scalar node, both input and output nodes share the same valueID. Operators that preserve value in this way will make this behavior clear by specifying the same valueID on its input and output schemas for the scalars whose value is being preserved.

3. Vectors: If an output vector schema node contains the same number of items in the corresponding structural-order (defined below) as the input vector node, both input and output vector nodes share the same valueID. Operators that preserve corresponding structural-order in this way will make this behavior clear by specifying the same valueID on its input and output schemas for the vectors whose structural-order is being preserved.

4. If the rules above do not apply, an output node has a new ValueID with new UID. This operator 132 is defined to be the valueOrigin of the output node.

An output vector, u, has the corresponding structural-order as an input vector, v, if the following holds, where u is a finite or infinite vector with the subscripts on the nodes denoting the position of an node in the vector:

$$u=\{u0, u1, u2 \ldots \}$$

In the following, v is a finite or infinite vector with the subscripts on the nodes denoting the position of an node in the vector:

$$v=\{v0, v1, v2 \ldots \}$$

For the following function:

$$vi=f(\{uj \text{ where } j=0 \ldots i\})$$

That is, vi is a function of ui, as well as all preceding values in the input vector u.

To clarify, suppose vi=f(ui). Then each output vector node is a function of exactly and only the input node in the corresponding position. This satisfies the notion of structural-order being the same; however, the definition of same structural order allows for the output vi to be a function of all preceding nodes of ui also. This allows the function f to represent a richer set of behaviors, such as moving averages or running totals that accumulate results from all the input vector nodes seen thus far.

As an example, suppose an input vector contains data nodes that are sorted on keys. The nodes contain those keys and also a variety of other integer values. An operator 132 may take in this ordered vector and compute a new output vector where the data nodes of that output vector contain only a single integer where that integer is not one of the keys on which the input vectors were ordered. If this integer in the output vector node is computed from the contents of the corresponding input vector node in the same position, then it may be said that the output vector has the corresponding structural-order as the input vector. When two vectors have this property where one is in the corresponding structural-order to the other, then they may be said to be "in the same order".

Figure 17:
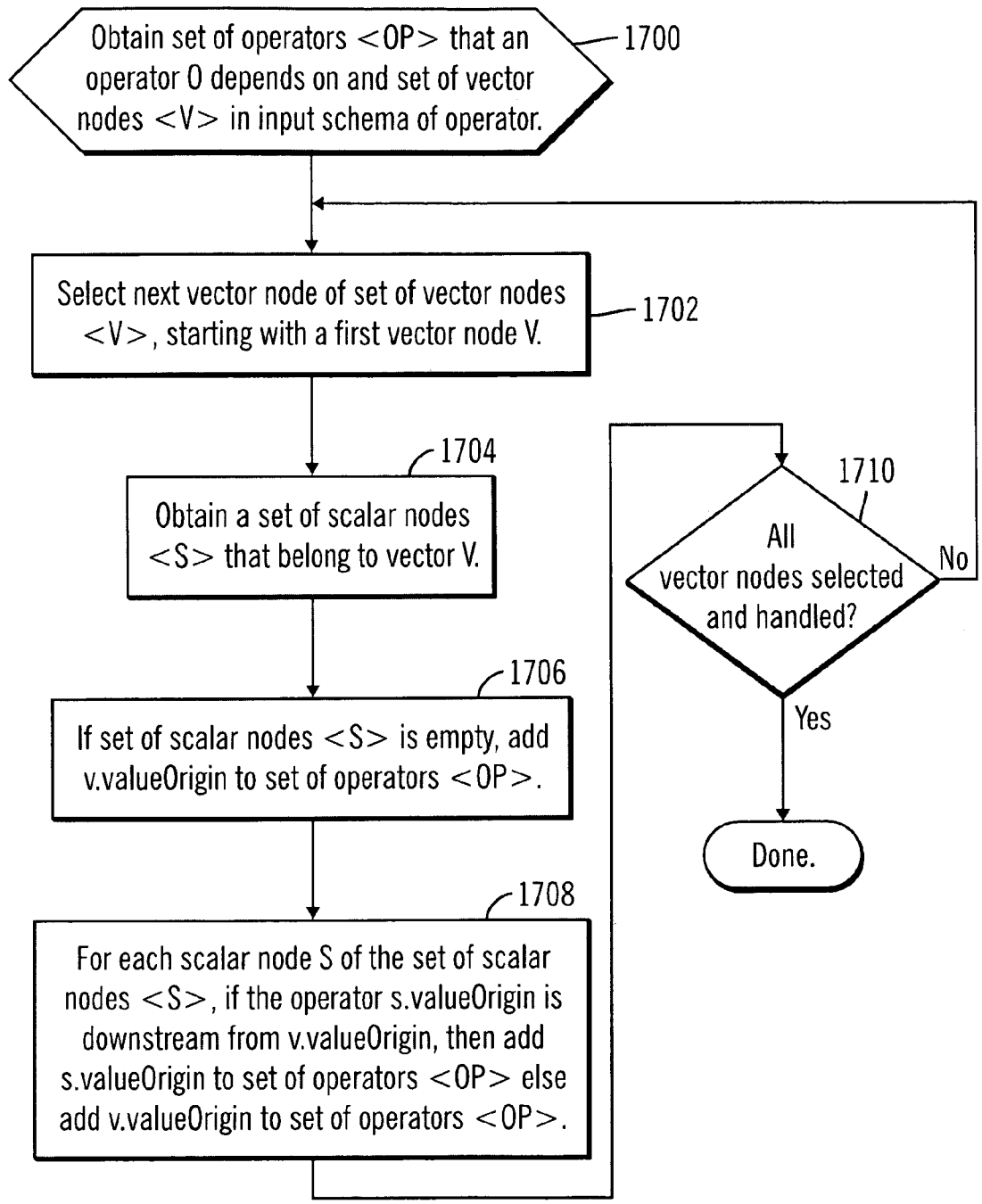
FIG. 17 illustrates logic performed by a compiler for finding a set of operators on which an operator depends in accordance with certain embodiments.

FIG. 17 illustrates logic performed by the process compiler 110 for finding a set of operators on which an operator depends in accordance with certain embodiments. Control begins at block 1700 with the process compiler 110 obtaining a set of operators <OP> that an operator O depends on and a set of vector nodes <V> in the input schema of the operator. There is always at least one member in the set of vector nodes <V> to begin with. In block 1702, the process compiler 110 selects a next vector node of a set of vector nodes <V>, starting with a first vector node V. In block 1704, the process compiler 110 obtains a set of scalar nodes <S> that belong to vector node V. In block 1706, if the set of scalar nodes <S> is empty, the process compiler 110 adds v.valueOrigin to the set of operators <OP>. As mentioned above, the valueID on a scalar has a value origin operator (s.valueOrigin), and the ValueID on a vector similarly has a value origin operator (v.valueOrigin). In block 1708, for each scalar node S of the set of scalar nodes <S>, if the operator s.valueOrigin is downstream from v.valueOrigin, then the process compiler 110 adds s.valueOrigin to the set of operators <OP>, else the process compiler 110 adds v.valueOrigin to the set of operators <OP>, In block 1710, the process compiler 110 determines whether all vector nodes have been selected and handled by blocks 704 and subsequent. If so, processing is done, otherwise, processing loops back to block 1702 to select another vector node V.

Thus, based on the definition of the ValueID, the valueID of an input schema node will have a reference to the operator 132 that created this value. This eliminates the need to traverse the linear processing graph 190 in order to find each node point of origin.

Figure 18:
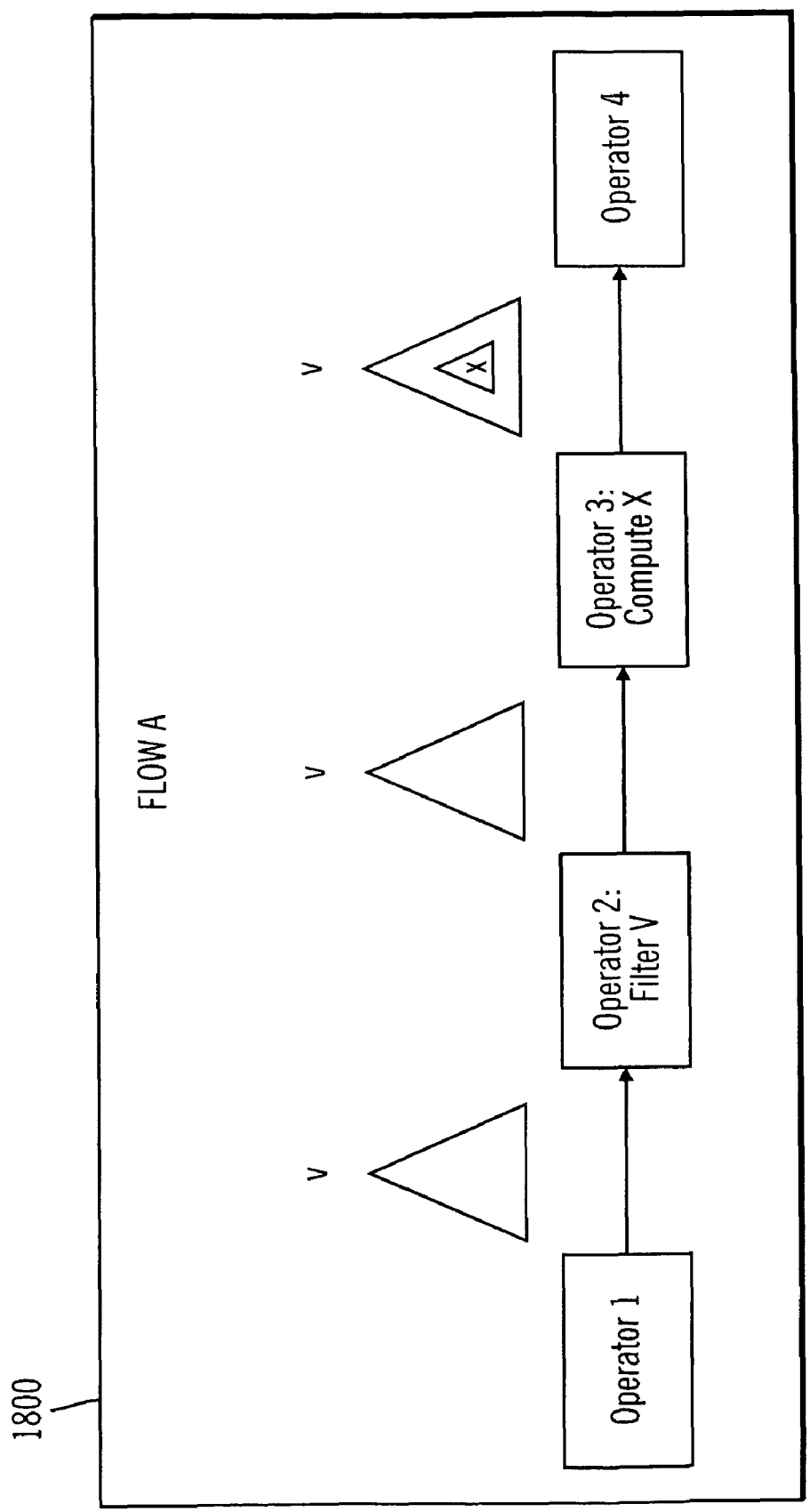
FIG. 18 illustrates Flow A in accordance with certain embodiments.

FIG. 18 illustrates Flow A 1800 in accordance with certain embodiments. In FIG. 18, operator 4 consumes X, therefore, operator 4 depends on operator 3, which computes X. However, operator 4 also depends on operator 2, which changes the cardinality of vector node V by filtering out some elements of the vector. Operator 4 is determined to depend on the operator that is closer to operator 4 in the original linear processing graph 190, since both of the contributions are needed for correctness.

Also, to be able to find the operator 132 that produces a scalar node, the optimization technique 112 considers the vector/cardinality property of the scalar.

Figure 19:
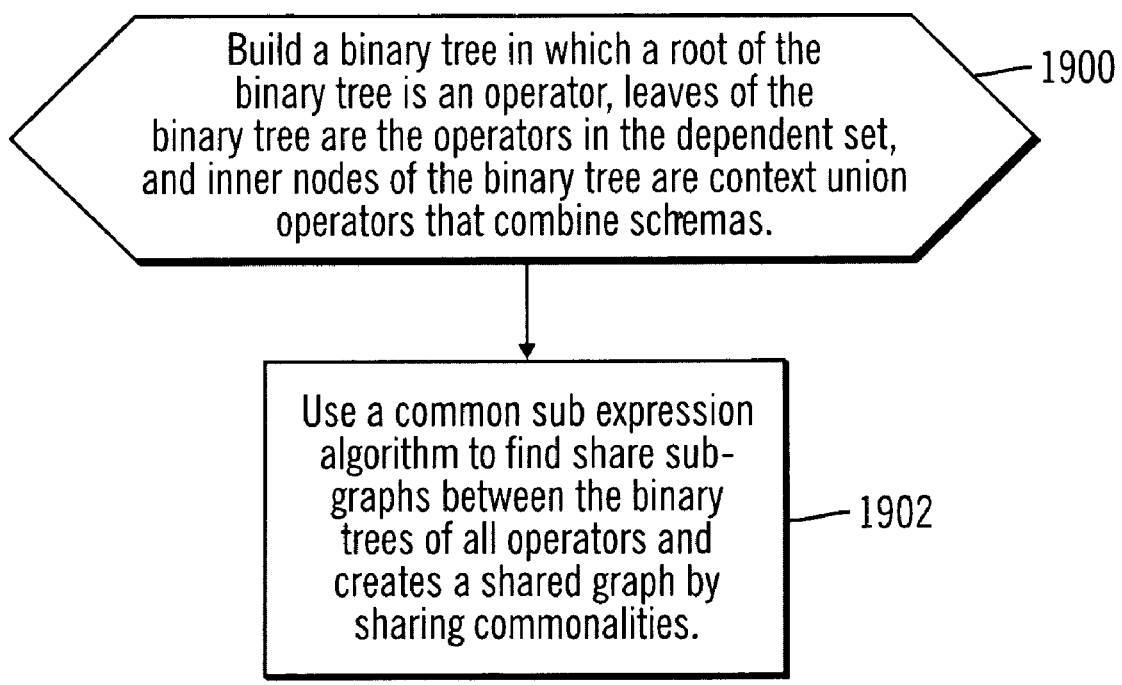
FIG. 19 illustrates logic performed by a compiler for rewriting a linear processing graph in accordance with certain embodiments.

FIG. 19 illustrates logic performed by the process compiler 110 for rewriting the linear processing graph 190 in accordance with certain embodiments. In FIG. 19, the processing compiler 110 computes a minimum set of context split and context merge operators. Control begins at block 1900 with the process compiler 110 building a binary tree in which a root of the binary tree is an operator, leaves of the binary tree are the operators in the dependent set, and inner nodes of the binary tree are context merge operators that combine schemas. In block 1902, the process compiler 110 uses a common sub expression algorithm to find share sub-graphs between the binary trees of all operators and creates an optimized graph by inserting context split operators 184 at each shared point.

Figure 20:
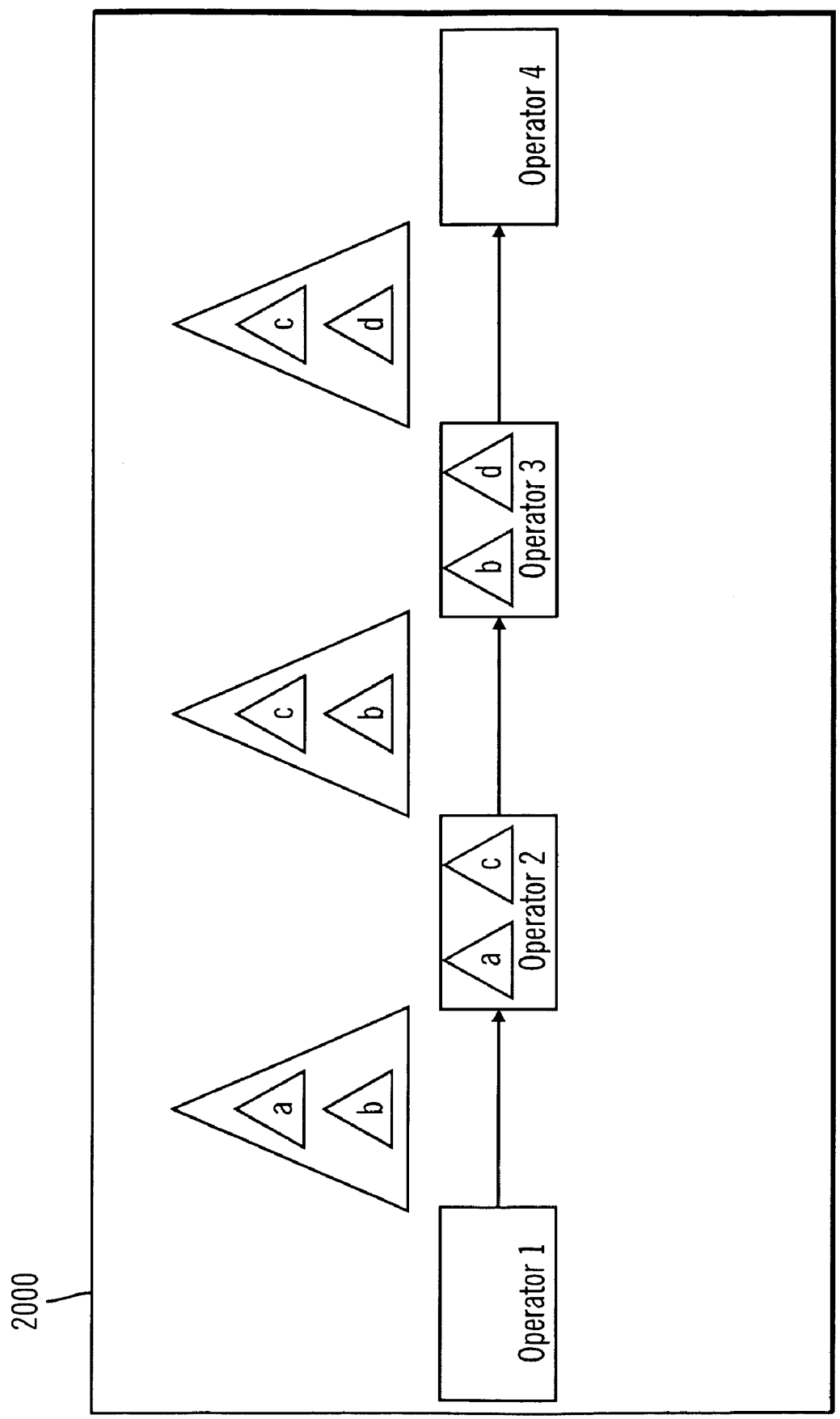
FIG. 20 illustrates a linear processing graph with four operators in accordance with certain embodiments.
Figure 22A:
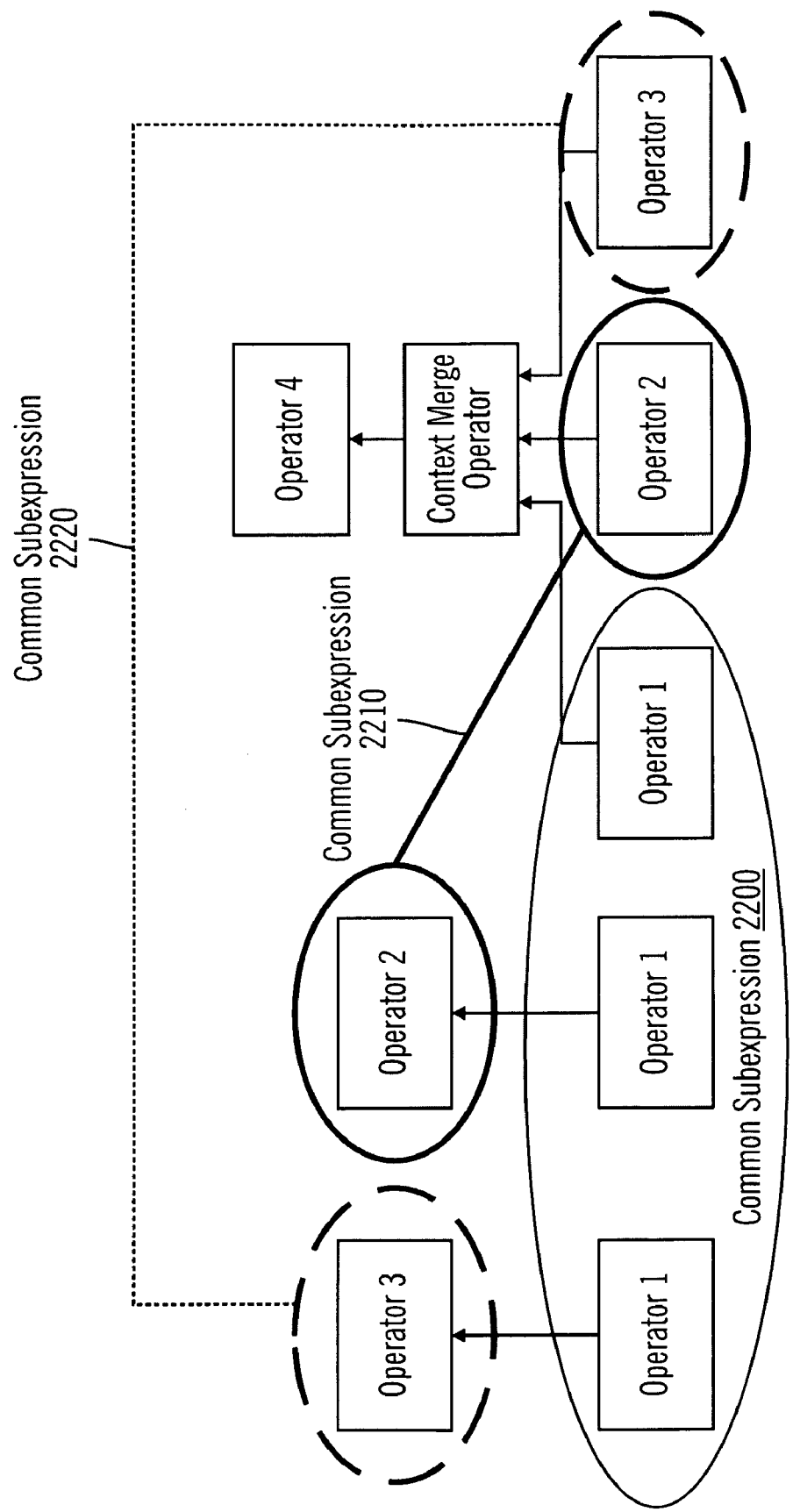
FIGS. 22A and 22B illustrate use of common subexpressions in accordance with certain embodiments.
Figure 22B:
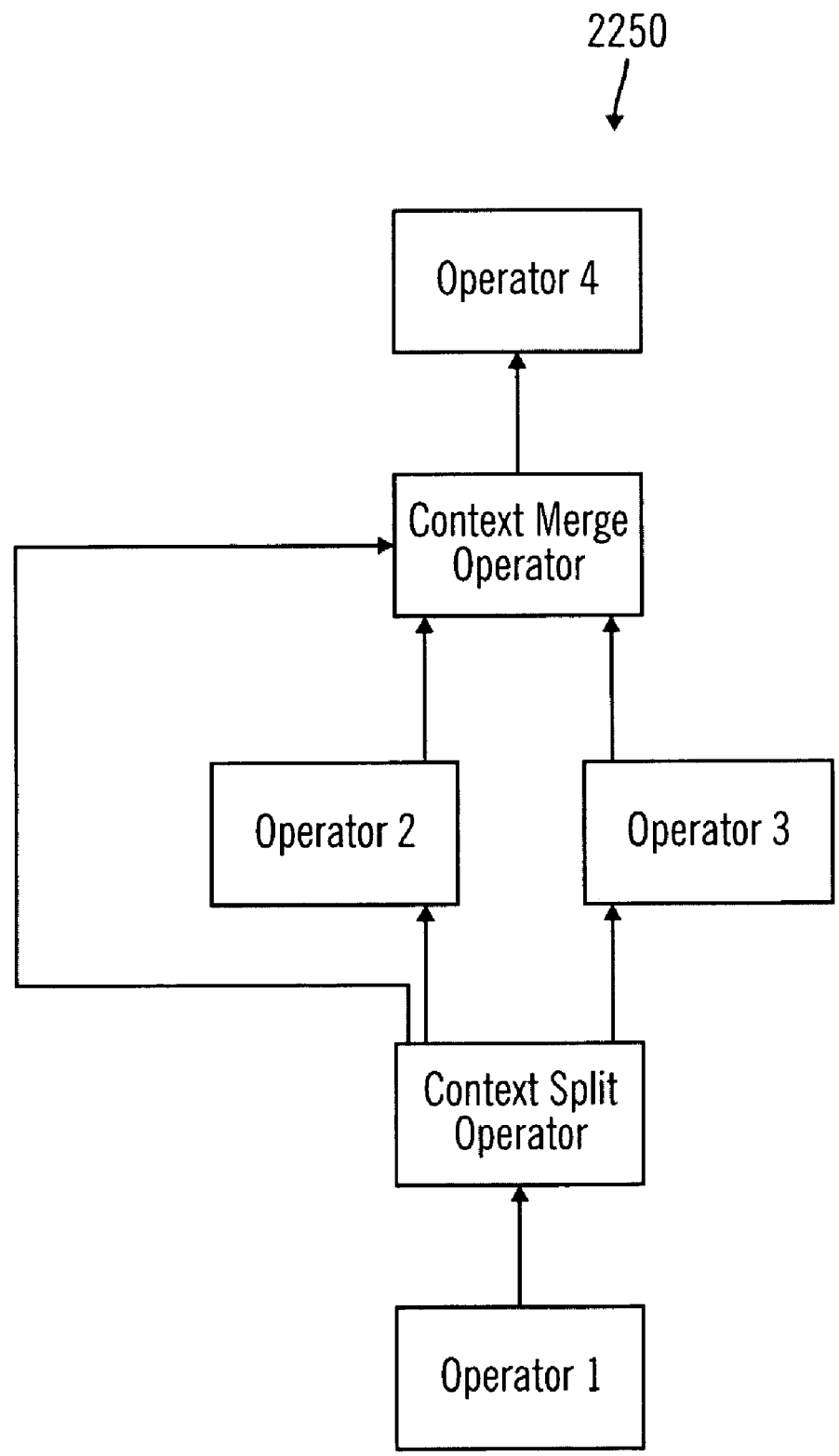

FIG. 20 illustrates a linear processing graph 2000 with four operators in accordance with certain embodiments. FIGS. 21A, 21B, and 21C illustrate diagrams of root operators and their leaves in accordance with certain embodiments. Examining the linear processing graph 2000 in FIG. 20, FIG. 21A shows that for operator3, the graph 2100 is rooted at operator3, which has one leaf, operator1. FIG. 21B shows that for operator2, the graph 2110 is rooted at operator2, which has one leaf, operator1. FIG. 21C shows that for operator4, the graph 2120 is rooted at operator4, which has a context merge operator as a child. The context merge operator has children: operator1, operator2, and operator3. FIGS. 22A and 22B illustrate use of common subexpressions in accordance with certain embodiments. FIG. 22A illustrates that there are three common subexpressions 2200, 2210, 2220. FIG. 22B illustrates that a context split operator has been inserted into graph 2250 at a point of sharing based on collapsing common subexpressions together.

Thus, the optimization technique 112 provided by embodiments reduces the complexity which the user needs to handle, allowing the user to create linear processing graphs 190. In addition, the optimization technique 112 ignores any false dependencies that the user might accidentally create. Moreover, the components of the system are more reusable since the same logic may be producing a new data item on the same arc or a new data item on a new arc.

Embodiments optimize processing of hierarchical data by eliminating false dependencies. Embodiments include Extract Transform Load (ETL) systems for processing hierarchical data structures, query processing systems, and/or message processing systems. Embodiments simplify integration process authoring and improve performance of the processes.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The computer-usable medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2, 3, 16, 17, and 19 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 3, 16, 17, and 19 may be implemented in software, hardware, programmable and non-programmable gate array logic or in some combination of hardware, software, or gate array logic.

Figure 23:
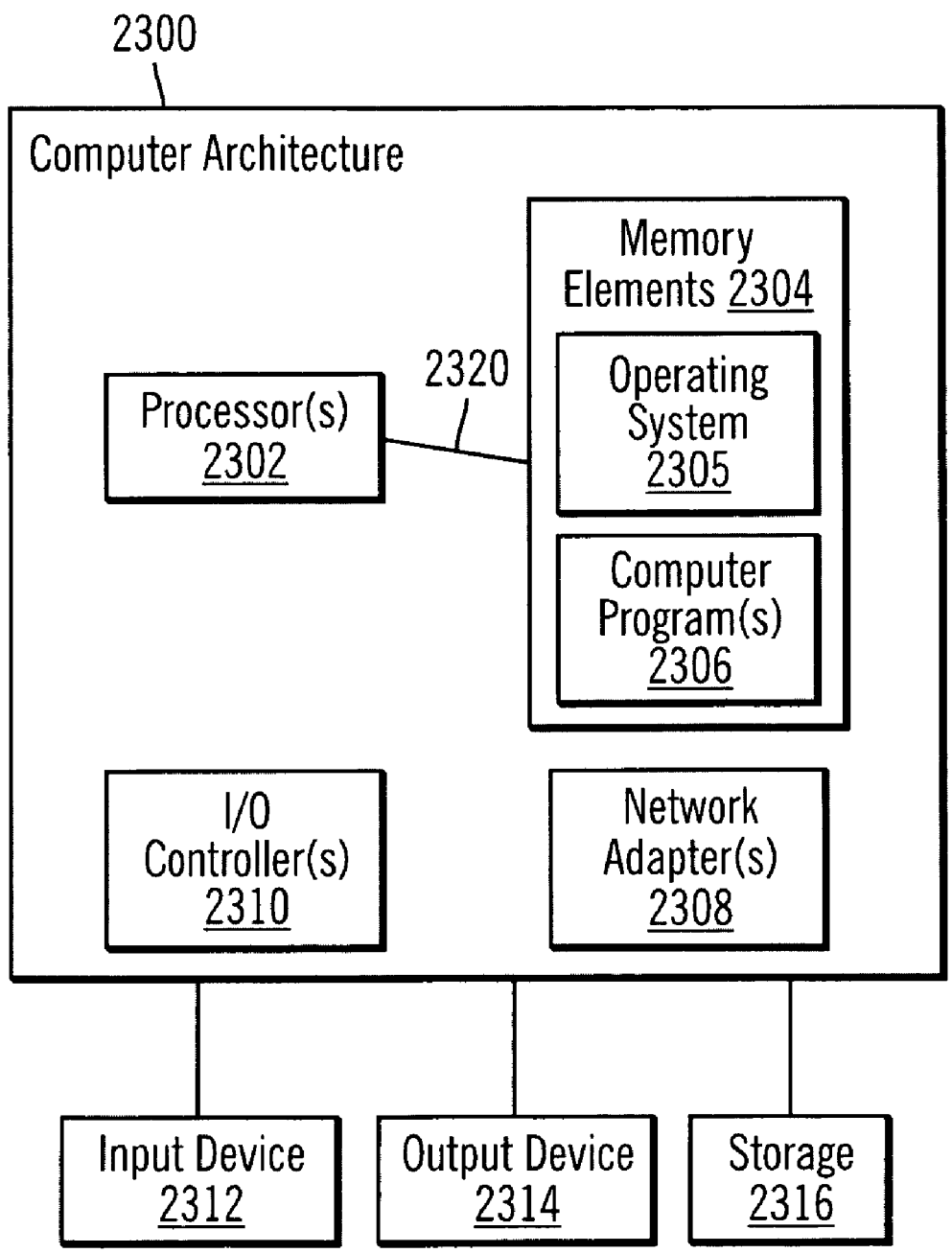
FIG. 23 illustrates a system architecture that may be used in accordance with certain embodiments.

FIG. 23 illustrates a system architecture 2300 that may be used in accordance with certain embodiments. Computing device 100 may implement system architecture 2300. The system architecture 2300 is suitable for storing and/or executing program code and includes at least one processor 2302 coupled directly or indirectly to memory elements 2304 through a system bus 2320. The memory elements 2304 may include local memory employed during actual execution of the program code, bulk storage, and cache memories which provide temporary storage of at least some program code in order to reduce the number of times code must be retrieved from bulk storage during execution. The memory elements 2304 include an operating system 2305 and one or more computer programs 2306.

Input/Output (I/O) devices 2312, 2314 (including but not limited to keyboards, displays, pointing devices, etc.) may be coupled to the system either directly or through intervening I/O controllers 2310.

Network adapters 2308 may also be coupled to the system to enable the data processing system to become coupled to other data processing systems or remote printers or storage devices through intervening private or public networks. Modems, cable modem and Ethernet cards are just a few of the currently available types of network adapters 2308.

The system architecture 2300 may be coupled to storage 2316 (e.g., a non-volatile storage area, such as magnetic disk drives, optical disk drives, a tape drive, etc.). The storage 2316 may comprise an internal storage device or an attached or network accessible storage. Computer programs 2306 in storage 2316 may be loaded into the memory elements 2304 and executed by a processor 2302 in a manner known in the art.

The system architecture 2300 may include fewer components than illustrated, additional components not illustrated herein, or some combination of the components illustrated and additional components. The system architecture 2300 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
receiving a linear processing graph, wherein the linear processing graph includes a plurality of operators, wherein each operator in the plurality is connected to at least one other operator by an arc, wherein hierarchical data flows on arcs, wherein the operators read and replace identified subregions within the hierarchical data flowing into the operators on the arcs, and wherein the operators do not modify the hierarchical data outside of these identified subregions;
for each operator in the linear processing graph, finding a minimal set of dependent upstream operators on which that operator depends by examining how the identified subregions are created in the linear processing graph while taking into consideration data preservation characteristics of the plurality of operators and taking into consideration structural-order preservation characteristics of the plurality of operators by:
obtaining a set of operators on which the operator depends;
obtaining a set of vector nodes of the hierarchical data in an input schema of the operator, wherein a vector node represents a vector including scalars that are represented by a set of scalar nodes; and
for each of the vector nodes, analyzing the set of scalar nodes to determine the dependencies, wherein a scalar node represents a scalar; and
rewriting the linear processing graph to create a new graph that expresses dependencies based on the minimal set of dependent upstream operators for each operator by inserting at least one context split operator and at least one context merge operator into the new graph.

2. The method of claim 1, wherein rewriting further comprises:
computing a minimum set of context split operators and context merge operators.

3. The method of claim 2, wherein the new graph comprises the at least one context split operator that provides data to at least two operators, wherein each of the two operators uses the provided data and further comprising:
inserting the at least one context split operator into the new graph at a point of sharing based on collapsing common sub-expressions together.

4. The method of claim 2, wherein the new graph comprises the at least one context merge operator that merges output of at least two operators in the new graph.

5. The method of claim 1, wherein the new graph comprises a directed graph.

6. A computer program product comprising a computer-readable storage medium including a computer readable program, wherein the computer readable program when executed on a computer causes the computer to:
receive a linear processing graph, wherein the linear processing graph includes a plurality of operators, wherein each operator in the plurality is connected to at least one other operator by an arc, wherein hierarchical data flows on arcs, wherein the operators read and replace identified subregions within the hierarchical data flowing into the operators on the arcs, and wherein the operators do not modify the hierarchical data outside of these identified subregions;
for each operator in the linear processing graph, find a minimal set of dependent upstream operators on which that operator depends by examining how the identified subregions are created in the linear processing graph while taking into consideration data preservation characteristics of the plurality of operators and taking into consideration structural-order preservation characteristics of the plurality of operators by:

obtaining a set of operators on which the operator depends;

obtaining a set of vector nodes of the hierarchical data in an input schema of the operator, wherein a vector node represents a vector including scalars that are represented by a set of scalar nodes; and for each of the vector nodes, analyzing the set of scalar nodes to determine the dependencies, wherein a scalar node represents a scalar; and rewrite the linear processing graph to create a new graph that expresses dependencies based on the minimal set of dependent upstream operators for each operator by inserting at least one context split operator and at least one context merge operator into the new graph.

7. The computer program product of claim 6, wherein when rewriting, the computer readable program when executed on a computer causes the computer to:

compute a minimum set of context split operators and context merge operators.

8. The computer program product of claim 7, wherein the new graph comprises the at least one context split operator that provides data to at least two operators, wherein each of the two operators uses the provided data, and wherein the computer readable program when executed on a computer causes the computer to:

insert the at least one context split operator into the new graph at a point of sharing based on collapsing common sub-expressions together.

9. The computer program product of claim 7, wherein the new graph comprises the at least one context merge operator that merges output of at least two operators in the new graph.

10. The computer program product of claim 6, wherein the new graph comprises a directed graph.

11. A system, comprising: hardware logic performing operations, the operations comprising:

receiving a linear processing graph, wherein the linear processing graph includes a plurality of operators, wherein each operator in the plurality is connected to at least one other operator by an arc, wherein hierarchical data flows on arcs, wherein the operators read and replace identified subregions within the hierarchical data flowing into the operators on the arcs, and wherein the operators do not modify the hierarchical data outside of these identified subregions;

for each operator in the linear processing graph, finding a minimal set of dependent upstream operators on which that operator depends by examining how the identified subregions are created in the linear processing graph while taking into consideration data preservation characteristics of the plurality of operators and taking into consideration structural-order preservation characteristics of the plurality of operators by:

obtaining a set of operators on which the operator depends;

obtaining a set of vector nodes of the hierarchical data in an input schema of the operator, wherein a vector node represents a vector including scalars that are represented by a set of scalar nodes; and for each of the vector nodes, analyzing the set of scalar nodes to determine the dependencies, wherein a scalar node represents a scalar; and rewriting the linear processing graph to create a new graph that expresses dependencies based on the minimal set of dependent upstream operators for each operator by inserting at least one context split operator and at least one context merge operator into the new graph.

12. The system of claim 11, wherein operations for rewriting further comprise:

computing a minimum set of context split operators and context merge operators.

13. The system of claim 11, wherein the new graph comprises the at least one context split operator that provides data to at least two operators, wherein each of the two operators uses the provided data, and wherein the operations further comprise:

inserting the at least one context split operator into the new graph at a point of sharing based on collapsing common sub-expressions together.

14. The system of claim 11, wherein the new graph comprises the at least one context merge operator that merges output of at least two operators in the new graph.

15. The system of claim 11, wherein the new graph comprises a directed graph.

* * * * *